(12) United States Patent
Sawachi

(10) Patent No.: US 8,345,085 B2
(45) Date of Patent: Jan. 1, 2013

(54) METHOD AND APPARATUS FOR GENERATING FILES FOR STEREOGRAPHIC IMAGE DISPLAY AND METHOD AND APPARATUS FOR CONTROLLING STEREOGRAPHIC IMAGE DISPLAY

(75) Inventor: Youichi Sawachi, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1410 days.

(21) Appl. No.: 11/962,170

(22) Filed: Dec. 21, 2007

(65) Prior Publication Data

US 2008/0151044 A1    Jun. 26, 2008

(30) Foreign Application Priority Data

Dec. 22, 2006  (JP) ................................. 2006-345788

(51) Int. Cl.
*H04N 13/02*    (2006.01)
(52) U.S. Cl. ............................... 348/46; 348/42; 348/43
(58) Field of Classification Search .............. 348/42–43, 348/46–48, 51
See application file for complete search history.

(56) References Cited

U.S. PATENT DOCUMENTS

| | | | | |
|---|---|---|---|---|
| 5,568,384 A * | 10/1996 | Robb et al. | ..................... | 715/202 |
| 6,009,359 A * | 12/1999 | El-Hakim et al. | .............. | 701/28 |
| 6,031,538 A * | 2/2000 | Chupeau et al. | ............... | 345/419 |
| 6,700,572 B1 * | 3/2004 | Koya | .............................. | 345/419 |
| 7,230,621 B2 * | 6/2007 | Adams, Jr. | ..................... | 345/427 |
| 7,277,565 B2 * | 10/2007 | Rasche et al. | ................. | 382/128 |
| 2002/0030675 A1 | 3/2002 | Kawai | | |
| 2003/0179193 A1 * | 9/2003 | Adams, Jr. | ..................... | 345/419 |
| 2004/0022418 A1 * | 2/2004 | Oota | ............................. | 382/106 |
| 2004/0175024 A1 * | 9/2004 | Rasche et al. | ................. | 382/128 |
| 2006/0239585 A1 * | 10/2006 | Valadez et al. | ................ | 382/275 |
| 2007/0248260 A1 * | 10/2007 | Pockett | ......................... | 382/154 |
| 2007/0257902 A1 | 11/2007 | Satoh et al. | | |
| 2008/0146923 A1 * | 6/2008 | Mejia et al. | .................... | 600/437 |
| 2008/0181305 A1 * | 7/2008 | Cho et al. | ................. | 375/240.12 |

FOREIGN PATENT DOCUMENTS

| | | | |
|---|---|---|---|
| JP | 2004-274091 A | 9/2004 | |
| JP | 2004-334833 A | 11/2004 | |

* cited by examiner

*Primary Examiner* — Brendan Higa
(74) *Attorney, Agent, or Firm* — Sughrue Mion, PLLC

(57) ABSTRACT

An apparatus for generating a file comprises a file obtaining means, image composing means and a file generating means. The file obtaining means obtains a main image file in which a main stereographic image is recorded and a sub-image file in which a sub-image is recorded. The image composing means generates a first synthetic stereographic image by synthesizing a sub-stereographic image reconstructed to conform to a main stereographic image with the main stereographic image and generates a second synthetic stereographic image by synthesizing a main stereographic image reconstructed to conform to a sub-stereographic image with the sub-stereographic image. The file generating means generates a file of a predetermined format including the synthetic first and second stereographic images.

9 Claims, 17 Drawing Sheets

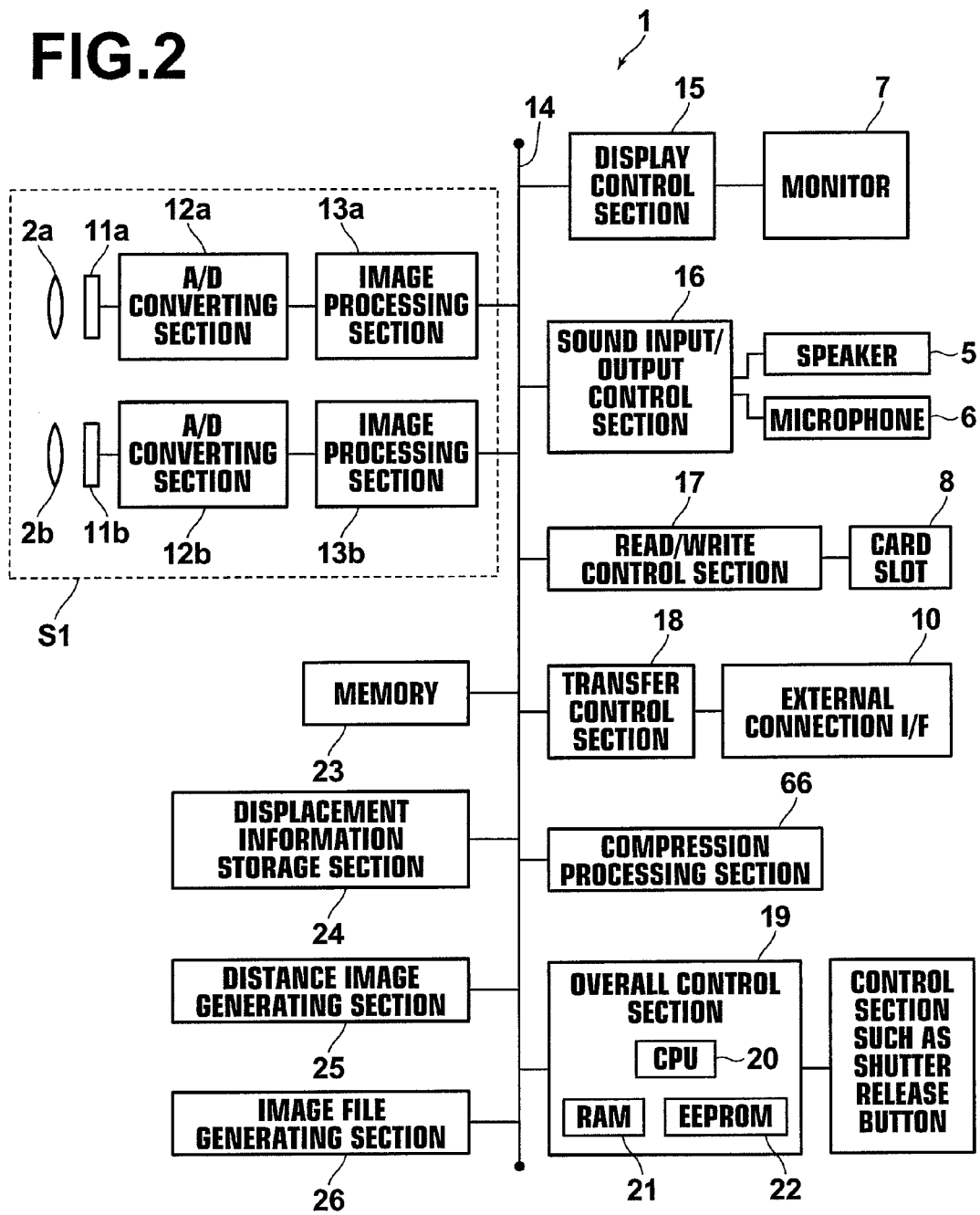

- h1 — ANGLE OF CONVERGENCE
- h2 — BASELINE LENGTH
- h3 — FOCAL LENGTH
- h4 — ANGLE OF VIEW
- h5 — SIZE OF DISTANCE IMAGE
- h6 — BYTE NUMBER PER ONE PIXEL OF DISTANCE IMAGE
- h7 — TYPE OF UNIVERSAL COORDINATE SYSTEM
- h8 — DISPLACEMENT INFORMATION OF UNIVERSAL COORDINATE SYSTEM
- h9 — USER INSTRUCTION INFORMATION

FIG.16
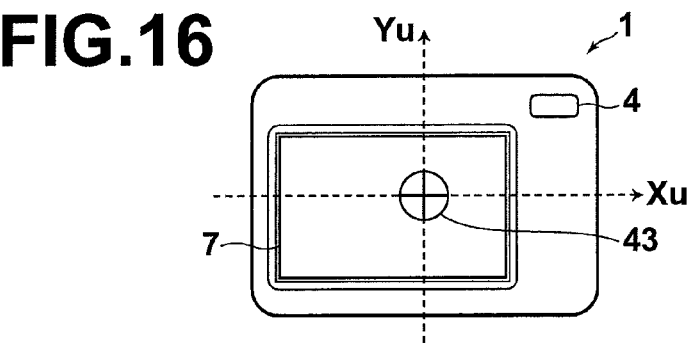
FIG.17
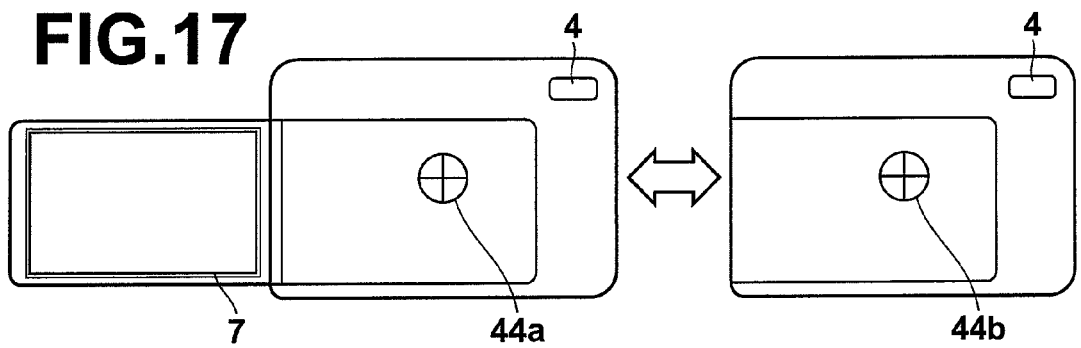
FIG.18
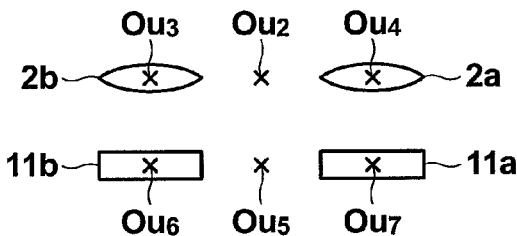
FIG.19
| 0 | 0, 0, 0 |
|---|---|
| 1 | Ou1 DISPLACEMENT INFORMATION |
| 2 | Ou2 DISPLACEMENT INFORMATION |
| 3 | Ou3 DISPLACEMENT INFORMATION |
| 4 | Ou4 DISPLACEMENT INFORMATION |
| 5 | Ou5 DISPLACEMENT INFORMATION |
| 6 | Ou6 DISPLACEMENT INFORMATION |
| 7 | Ou7 DISPLACEMENT INFORMATION |
| 8 | 0, 0, 0 |
| 9 | 0, 0, 0 |
| 10 | 0, 0, 0 |

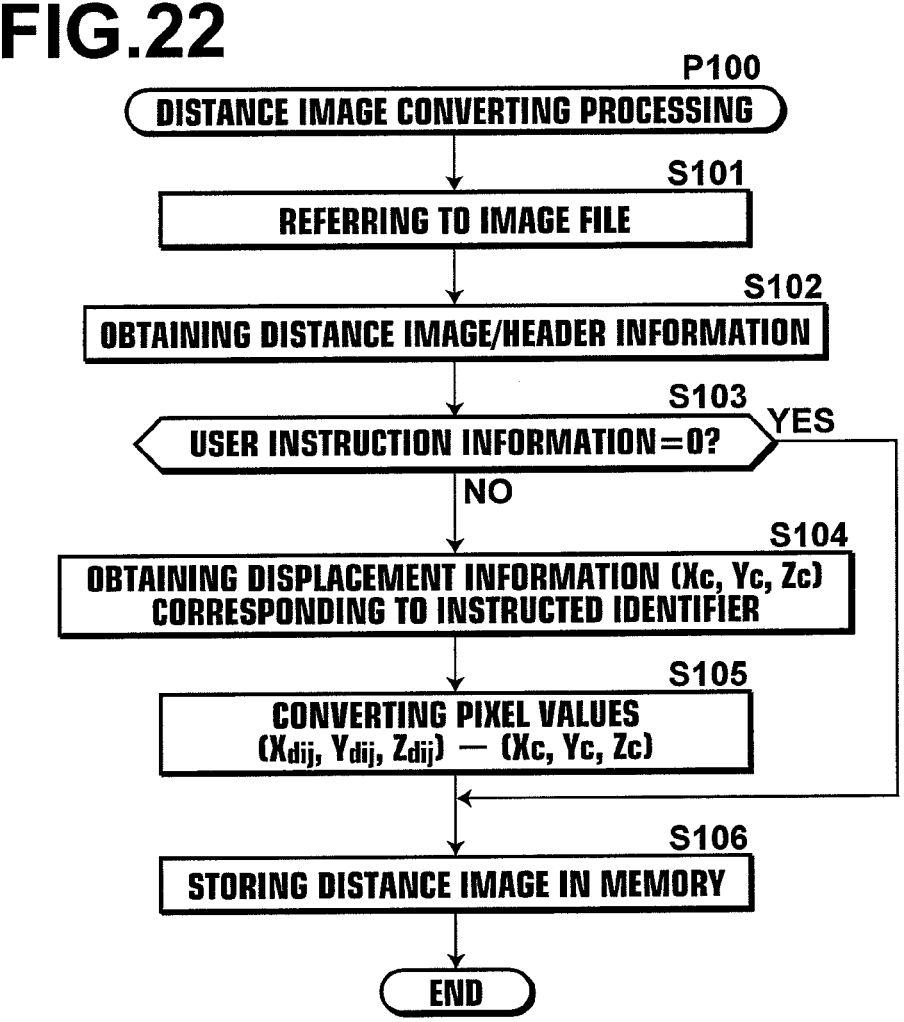
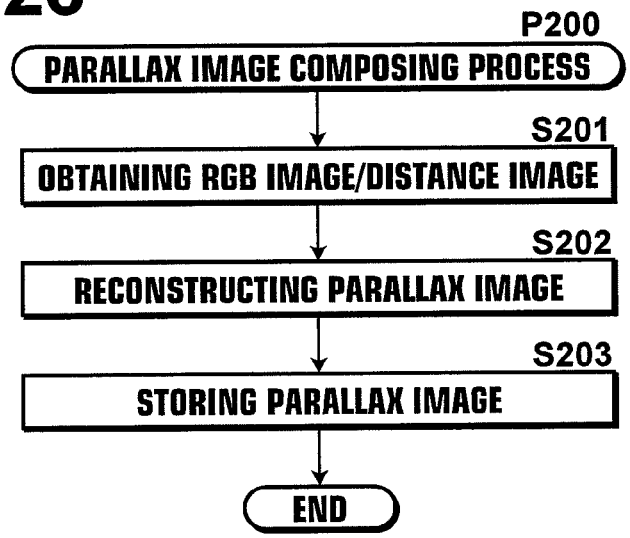

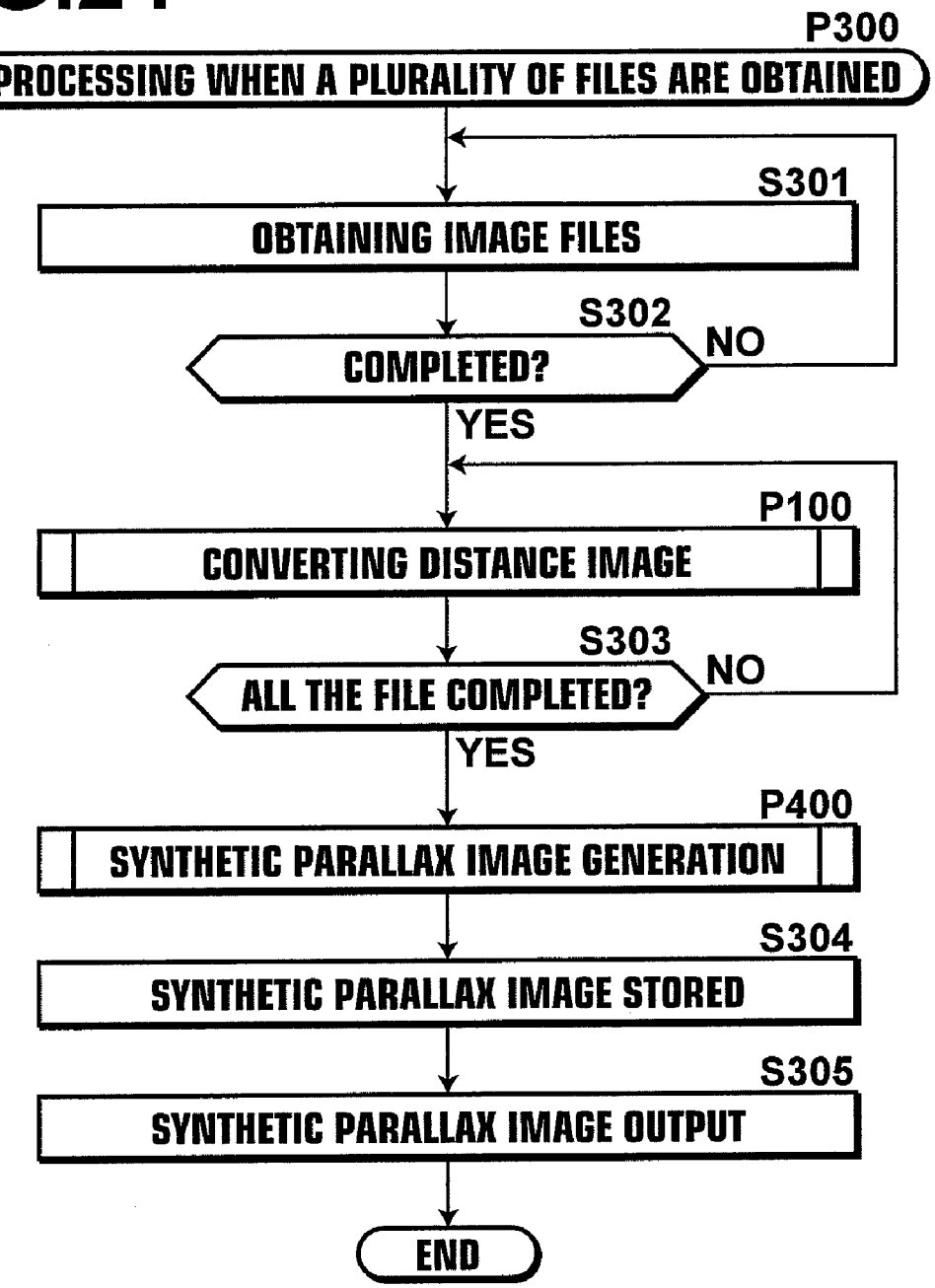

FIG.33
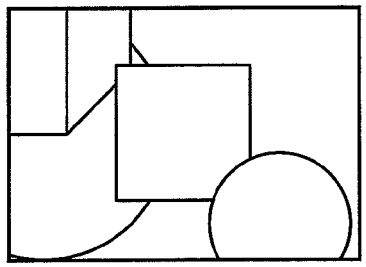
FIG.34
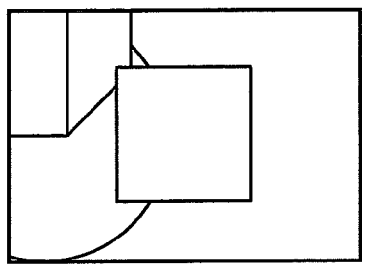
FIG.35
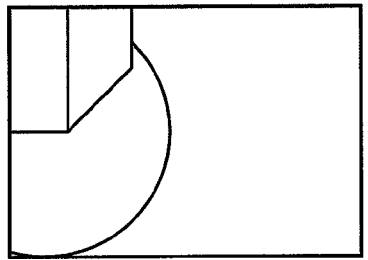
FIG.36
| HEADER H' |
|---|
| SYNTHETIC PARALLAX IMAGE (OVERALL) |
| SYNTHETIC PARALLAX IMAGE (ONLY DISPOSING AREA OF THE SUB-IMAGE (1)) |
| SYNTHETIC PARALLAX IMAGE (ONLY DISPOSING AREA OF THE SUB-IMAGE (2)) |
| ⋮ |
| SYNTHETIC PARALLAX IMAGE (ONLY DISPOSING AREA OF THE SUB-IMAGE (N)) |

METHOD AND APPARATUS FOR GENERATING FILES FOR STEREOGRAPHIC IMAGE DISPLAY AND METHOD AND APPARATUS FOR CONTROLLING STEREOGRAPHIC IMAGE DISPLAY

BACKGROUND OF THE INVENTION

1. Field of the Invention

This invention relates to a method and apparatus for generating an image file in which data for a stereographic display is recorded and a method and apparatus for controlling an image display when a stereographic synthetic image is to be displayed.

2. Description of the Related Art

In the field of computer vision, the position of a point, which is visually recognized when a photography space is seen from a certain direction, is optically measured, whereby a three-dimensional shape of an object disposed in the photography space is recognized or the depth of the photography space is recognized. As a method of measurement, there have been known a stereo image method where the principle of trigonometry is used, a TOF (time of flight) method where a time from the projection of light to receipt of the reflected light is measured, and a light section method where pattern light is investigated when slit light is projected.

An image, in which the position of the visually recognizable point is represented by coordinates of a predetermined coordinate system and the values of the coordinates are recorded as pixel values, is generally called a "distance image" or a "depth image". Such a distance image includes information on a spatial position recognized by humans due to the fact that humans see objects with both eyes. On the other hand, the RGB data or a gradation image obtained by normal photography includes information on color and/or brightness recognized by a human when he or she sees an object. Accordingly, by combination of information obtained from the distance image and information obtained from the RGB data or the like, information substantially equivalent to that obtained by vision of a human when he or she sees the object can be recognized by a computer. Further, this makes it feasible to form and display an image which is viewed as a stereographic by the human. For example, in U.S. Patent Application Publication No. 20020030675, an apparatus or a system for a stereographic image display is disclosed.

In the image processing of two-dimensional images, synthesis of a plurality of images into an image of a new composition is often carried out. In the case of stereographic images as well, there are many needs where a plurality of pieces of data for a stereographic display obtained through a plurality of cameras (or through a camera at different times) are synthesized into an image of a new composition. Further, in display control of a two-dimensional image, enlargement of a specified region of interest is often carried out. There are needs also in the stereographic display to carry out the same display control.

However, since the image processing of a three-dimensional image is more complicated and requires longer time as compared with a two-dimensional image, the displaying speed is lowered when the synthesis or the enlargement is carried out immediately before.

SUMMARY OF THE INVENTION

In view of the foregoing observation and description above, the primary object of the present invention is to carry out desired display without lowering the displaying speed when an image is displayed after synthesis of a plurality of pieces of data or when a region of interest is specified and the specified part is to be displayed in an enlarged scale.

In a first aspect of the present invention, there is provided an apparatus for generating an image file for use in a stereographic display that comprises a file obtaining means, image composing means and a file generating means, which will be described below.

The file obtaining means obtains a main image file in which a main stereographic image is recorded and a sub-image file in which a sub-image is recorded. The main and sub-stereographic images are preferred to be an image comprising a distance image where positional coordinates in a predetermined coordinate system of points taken by an imaging system are recorded as values of a pixel corresponding to each point, and a parallax image in which the color of each of the points is recorded as values of a pixel corresponding to each point. It is not necessary to determine which of the stereographic images recorded in the image files is to be designated as the main stereographic image at the time that the files are obtained. Further, the file obtaining means may obtain a plurality of files as sub-image files.

The image composing means generates a first synthetic stereographic image by reconstructing a sub-stereographic image to conform to a main stereographic image and synthesizing the sub-stereographic image with the main stereographic image, and generates a second synthetic stereographic image by reconstructing a main stereographic image to conform to a sub-stereographic image and synthesizing the main stereographic image with the sub-stereographic image. The expression "reconstructing the sub-stereographic image to conform to the main stereographic image" means to remake the sub-stereographic image to a shape suited for synthesis with the main stereographic image without changing the main stereographic image when the sub-stereographic image is synthesized with the main stereographic image. Specifically, the expression refers to an adjustment of the number of pixels (enlargement/reduction), the color of the same, or the like. The expression "reconstructing the main stereographic image to conform to the sub-stereographic image" means the reverse thereof.

The file generating means generates a file of a predetermined format including the synthetic first and second stereographic images. Otherwise, the file generating means may generate a file of a format further including information on the position of the sub-stereographic image in the main stereographic image, when the sub-stereographic image is synthesized with the main stereographic image.

Further, when the file obtaining means obtains a plurality of sub-image files, the image composing means generates the synthetic second stereographic images for the sub-stereographic image recorded in each of the sub-image files, and the file generating means generates a file of a format including a plurality of the synthetic second stereographic images. Preferably the file generating means is provided with a distance image converting means which converts the coordinate system of the distance image for the main stereographic image and the distance image for each sub-stereographic image, into distance images represented in a universal coordinate system common to a plurality of imaging systems.

When the main stereographic image and the sub-stereographic image have been taken with different cameras, the results of the synthesis sometimes is not as intended due to the fact that the distance images forming the stereographic images are represented in different coordinate systems. However, highly accurate synthesis can be realized by equalizing the coordinate systems.

The file generating means is further provided with a range setting means which sets the range in a direction of depth of the sub-stereographic image so that the image composing means may reconstruct the main stereographic image to conform to the sub-stereographic image by solely using the range set by the range setting means for the main stereographic image when reconstructing the main stereographic image to conform to the sub-stereographic image.

Further, in a second aspect of the present invention, there is provided a method for generating an image file for use in a stereographic display, that comprises the steps of:

obtaining a main image file in which a main stereographic image is recorded and a sub-image file in which a sub-image is recorded;

generating a first synthetic stereographic image by reconstructing the sub-stereographic image to conform to a main stereographic image and synthesizing the reconstructed sub-stereographic image with the main stereographic image;

generating a second synthetic stereographic image by reconstructing a main stereographic image to conform to a sub-stereographic image and synthesizing the reconstructed main stereographic image with the sub-stereographic image; and generating a file of a predetermined format including the first and second synthetic stereographic images.

In an image file generated according to the apparatus and method of the first and second aspects of the present invention, the first synthetic stereographic image generated on the basis of the main stereographic image and the second synthetic stereographic image generated on the basis of the sub-stereographic image are stored. When a stereographic image is to be displayed, the first and second synthetic stereographic images stored in the image file have only to be reproduced on the screen. Accordingly, high-speed display of stereographic images can be realized. Further, since synthesis of the images becomes unnecessary every time the stereographic image is displayed, the structure of the display apparatus can be simplified, which leads to a reduction in the size and cost of the apparatus. Further, since, in the first synthetic stereographic image, information carried by the main stereographic image is accurately included and in the second synthetic stereographic image, information carried by the sub-stereographic image is accurately included, the user can observe the stereographic image which is suitable for the purpose by switching the displays so that, for instance, the first synthetic stereographic image is displayed when the overall image is to be observed and the second synthetic stereographic image is displayed when only the region of interest is to be observed.

In accordance with a third aspect of the present invention, there is provided an apparatus for controlling display of a stereographic image that comprises a file obtaining means, a range setting means, a reconstructing means, a synthesizing means and an output control means, which will be described below. The file obtaining means obtains a main image file in which a main stereographic image is recorded and a sub-image file in which a sub-image is recorded. The range setting means sets the range in a direction of depth of the sub-stereographic image. The reconstructing means reconstructs the sub-stereographic image to conform to the main stereographic image and reconstructs the main stereographic image to conform to the sub-stereographic image by using only information within the range set by the range setting means. The synthesizing means generates a first synthetic stereographic image by synthesizing the reconstructed sub-stereographic image with the main stereographic image and generates a second synthetic stereographic image by synthesizing the reconstructed main stereographic image with the sub-stereographic image. The output control means controls the output of the first and second synthetic stereographic images to a predetermined screen.

In accordance with a fourth aspect of the present invention, there is provided a method for controlling display of a stereographic image that comprises the steps of obtaining a main image file in which a main stereographic image is recorded and a sub-image file in which a sub-image is recorded, setting the range in a direction of depth of the sub-stereographic image, reconstructing the sub-stereographic image to conform to the main stereographic image and the main stereographic image to conform to the sub-stereographic image by using only information within the range set by the range setting means, generating a first synthetic stereographic image by synthesizing the reconstructed sub-stereographic image with the main stereographic image and a second synthetic stereographic image by synthesizing the reconstructed main stereographic image with the sub-stereographic image, and outputting the first and second synthetic stereographic images to a predetermined screen.

According to the method of the fourth aspect of the present invention, in the second synthetic stereographic image synthesized on the basis of the sub-stereographic image, information included in a range out of the range where the main stereographic image has been set is not included. Accordingly, the user only has to set the range so that the unnecessary information of the main stereographic image is not displayed when he or she wants to observe the synthetic stereographic image while giving attention to the information included in the sub-stereographic image, which is convenient in observing the synthetic stereographic image.

BRIEF DESCRIPTION OF THE DRAWINGS

FIG. 2 is a block diagram showing inside structure of the stereo camera, FIG. 16 is a view showing an example of the origin recognizable through an appearance, FIG. 17 is a view showing another example of the origin recognizable through an appearance, FIG. 18 is a view showing another prospect of the origin of the universal coordinate system, FIG. 19 is a view showing a detailed format of the area h8 where the displacement information is set, FIG. 22 is a flowchart showing an example of the processing of the distance image converting section, FIG. 23 is a flowchart showing an example of the processing of the image composing section, FIG. 24 is a flowchart showing an example of the display control processing when taking in a plurality of image files, FIG. 25 is a view showing an example of the relation between the camera, photography space, and the universal coordinate system when the main image is taken in, FIG. 33 is a view showing an example of the display in only the sub-image disposing area, FIG. 34 is a view showing an example of the special display in only the sub-image disposing area, FIG. 35 is a view showing an example of the correction of the partly enlarged image for the special display, FIG. 36 is a view showing the format of the synthetic parallax image file.

PREFERRED EMBODIMENT OF THE INVENTION

Embodiments of a file generating apparatus of the present invention will be described with reference to the drawings, hereinbelow. Though a file generating apparatus of the present invention can generate a synthetic image file by taking in files from existing image taking apparatuses, the file generating apparatus generates a synthetic image file from image files of a new format, by way of example, in the present embodiment described hereinbelow.

[Obtainment of the Files to be Synthesized]

A stereo camera for obtaining individual stereographic images to be synthesized and a format of the image files output from the stereo camera will be described first.

Figure 1A:
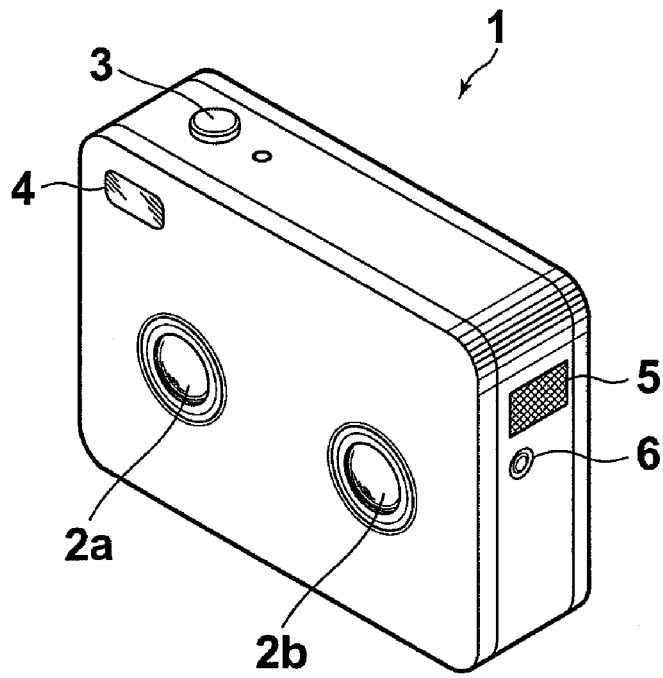
FIG. 1A is a perspective view as seen from front showing an appearance of a stereo camera employed in obtaining the files to be synthesized.
Figure 1B:
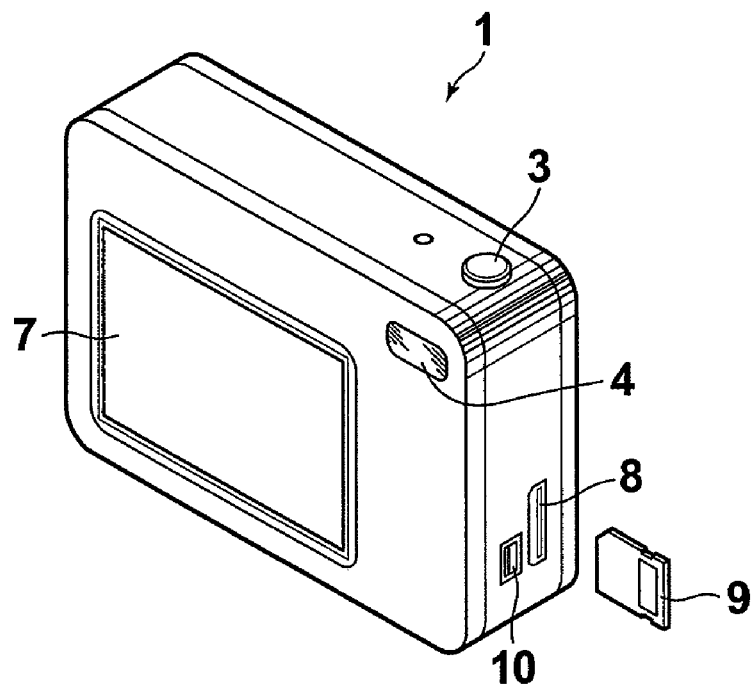
FIG. 1B is a perspective view as seen from rear showing an appearance of the stereo camera.

FIGS. 1A and 1B are perspective views respectively as seen from the front and the rear showing the appearance of a stereo camera in accordance with an embodiment of the file generating apparatus of the present invention. The stereo camera 1 is of a type where the depth of a photography space is measured by a stereo method and is provided with a pair of imaging lenses 2a and 2b. The stereo camera 1 is further provided with a shutter release button 3, a viewfinder 4, a speaker 5, a microphone 6, a liquid crystal monitor 7, a card slot 8 for setting a memory card 9, an external connection interface 10 for connecting a cable, and other control buttons or dials (not shown) as the common digital cameras.

FIG. 2 is a block diagram showing inside structure of the stereo camera 1. As shown in FIG. 2, the stereo camera 1 is provided with an imaging system comprising the imaging lenses 2a and 2b, a diaphragm (not shown), a pair of CCD's 11a and 11b and mechanisms (motor, control circuit and the like; not shown) for controlling the position or orientation of the lenses, opening and closure of the diaphragm and the electric charge/discharge condition of the CCD's and is further provided with a pair of A/D converting sections 12a and 12b as means for converting the signal obtained by the imaging system to digital data. The baseline length and the angle of convergence of the imaging system can be varied, by changing the position or orientation of the lenses 2a and 2b (including the CCD and the like) by driving the motor.

The stereo camera 1 is further provided with a display control section 15 for controlling display output to a monitor 7, a sound input/output control section 16 for controlling output to the speaker 5 and input from the microphone 6, a read/write control section 17 for controlling recording of data in a memory card 9 loaded in the card slot 8 and reading of data from a memory card 9 loaded in the card slot 8, and a transfer control section 18 for controlling the input/output between instruments connected to the external connection interface 10. These control sections are mounted respectively as a dedicated circuit or a driver program.

Further, the stereo camera 1 is provided with a memory 23 such as a SDRAM and an overall control section 19 which controls the action of the overall camera. The overall control section 19 comprises a RAM 21 in which a control program has been recorded, an EEPROM in which various default values for control have been recorded, and a CPU 20 for executing the control program, and in response to receipt of input from the control section such as the shutter release button 3, transfers instruction signals to the corresponding parts directly or by way of the system bus 14. The corresponding parts execute their processes while exchanging the processed data by way of the memory 23.

In addition to the above described functions, image processing sections 13a and 13b, a compression processing section 66, a displacement information storage section 24, a distance image generating section 25, and an image file generating section 26 are connected to the system bus 14. In this instance, the displacement information storage section 24 is mounted as an EEPROM which stores data to be described later, and the image processing sections 13a and 13b, compression processing section 66, distance image generating section 25, and the image file generating section 26 are mounted as dedicated processors, respectively. However, the form of mounting of these processing sections is not limited. For example, they may be mounted as one processor which is provided with the above described functions or may be mounted as a program stored in the RAM 21 of the overall control section 19.

The operation of the stereo camera 1 will be described hereinbelow, while remarking the processing in the image processing sections 13a and 13b, the displacement information storage section 24, distance image generating section 25, and the image file generating section 26.

Figure 3:
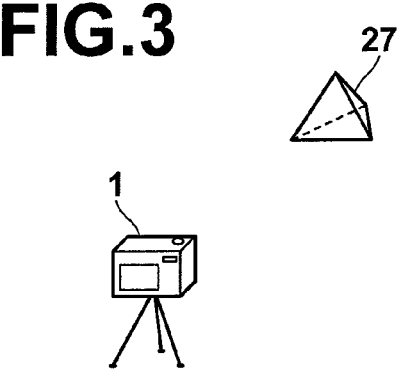
FIG. 3 is a view showing an example of the photography space.
Figure 4:
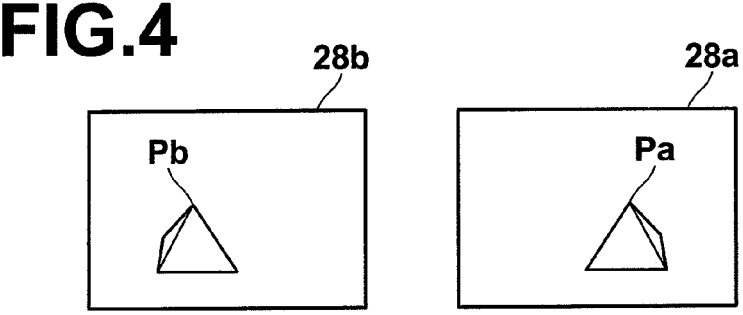
FIG. 4 is a view showing an example of the parallax image (RGB data)

When an operation for photography, such as depression of the shutter release button 3 is carried out, the operation is detected by the overall control section 19. The overall control section 19 outputs the various instruction signals to the imaging system. Thereby, video signals representing a photography space are input into the A/D converting sections 12a and 12b from the imaging system and a pair of pieces of image data are output respectively from. In this instance, each piece of image data is in the form of RGB data. The pieces of RGB data respectively supplied from the A/D converting sections 12a and 12b are stored in the memory 23 by the image processing sections 13a and 13b. For example, when an image of an object 27 shaped like a pyramid as shown in FIG. 3 is imaged, RGB data 28a obtained through the imaging lens 2a and RGB data 28b obtained through the imaging lens 2b are stored in the memory 23 as shown in FIG. 4.

Then, the image processing sections 13a and 13b carries out RGB-YCC conversion on the pieces of RGB data respectively supplied from the A/D converting sections 12a and 12b. Then, the pieces of the YCC data obtained by the RGB-YCC conversion are stored in the memory 23. Thereafter the pieces of the YCC data are read out by the compression processing section 66 and are stored again in the memory 23 after compression. With this structure, two pieces of YCC data generated by converting and compressing two pieces of RGB data respectively obtained through the imaging lens 2a and obtained through the imaging lens 2b at the same moment are stored in the memory 23. It is possible to compress the RGB data as it is by the compression processing section 66 without RGB-YCC conversion. In this case, in the processes to be described below, YCC data should be read as RGB data.

The distance image generating section 25 reads out two pieces of RGB data obtained simultaneously through different lenses. Then, pixels forming two pieces of RGB data are linked by a pattern matching process. For example, in the case of the example shown in FIG. 4, the pixel Pa in the RGB data 28a is linked with the pixel Pb in the RGB data 28b. The other pixels forming the RGB data 28a and 28b are similarly linked with each other.

Figure 5:
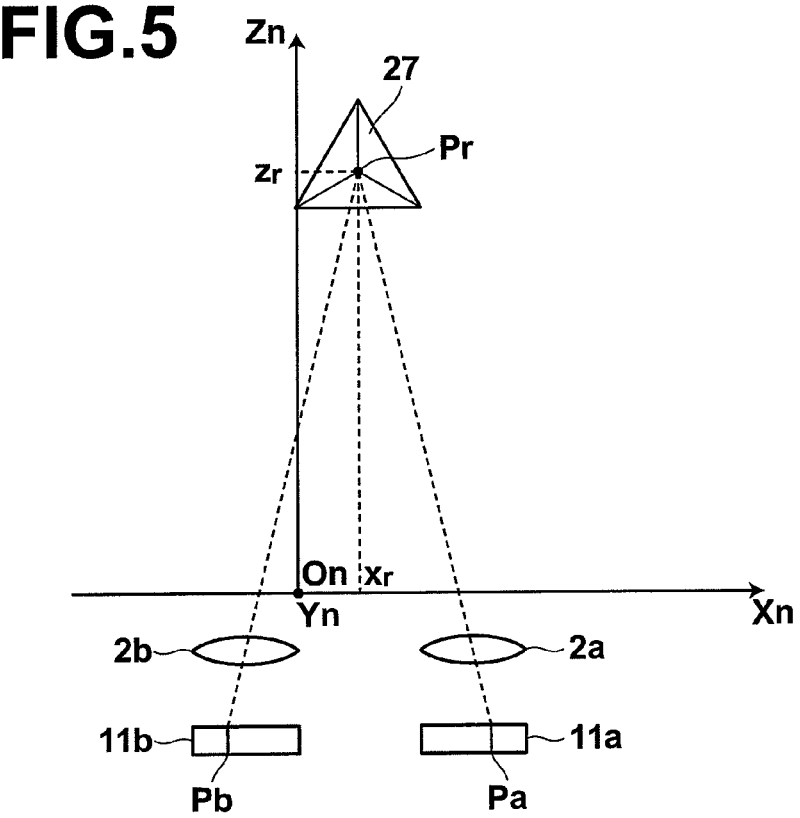
FIG. 5 is a view showing an example of the inherent coordinate system.

Then, the distance image generating section 25 carries out calculations based on trigonometry by the use of information on the above links among the pixels, the baseline length and the angle of convergence, and obtains the values of the spatial coordinates for all of the points taken by the camera in the photography space. This calculation is carried out on an inherent coordinate system and the positions of each point are represented by the values of the inherent coordinate system. FIG. 5 shows an inherent coordinate system in the form of orthogonal coordinate system, where the right and left direction of the stereo camera 1 is taken as the Xn axis, the up and down direction of the stereo camera 1 is taken as the Yn axis (not shown) and the direction from the rear to the front of the stereo camera 1 is taken as the Zn axis, disposed in the photography space shown in FIG. 3. In the illustrated example, the origin of the inherent coordinate system is slightly shifted toward the imaging lens 2b from the center of the camera in the front side of the camera. The position of the point Pr in the photography space represented by the pixel Pa in the RGB data 28a and the pixel Pb in the RGB data 28b is represented by (xr, yr, zr), although yr is not shown.

When the values (x, y, z) of the coordinates are determined for all of the points taken by the camera through the repeated calculation, the distance image generating section 25 records the values (x, y, z) of the coordinates for each point as the distance image of the photography space. For example, the x-value, y-value and z-value of each point are recorded respectively as 8 bit pixel data. Then a generated distance image is stored in the memory 23 together with the RGB data and the YCC data. The distance image may be compressed by the compression processing section 66 as the YCC data.

Figure 6:
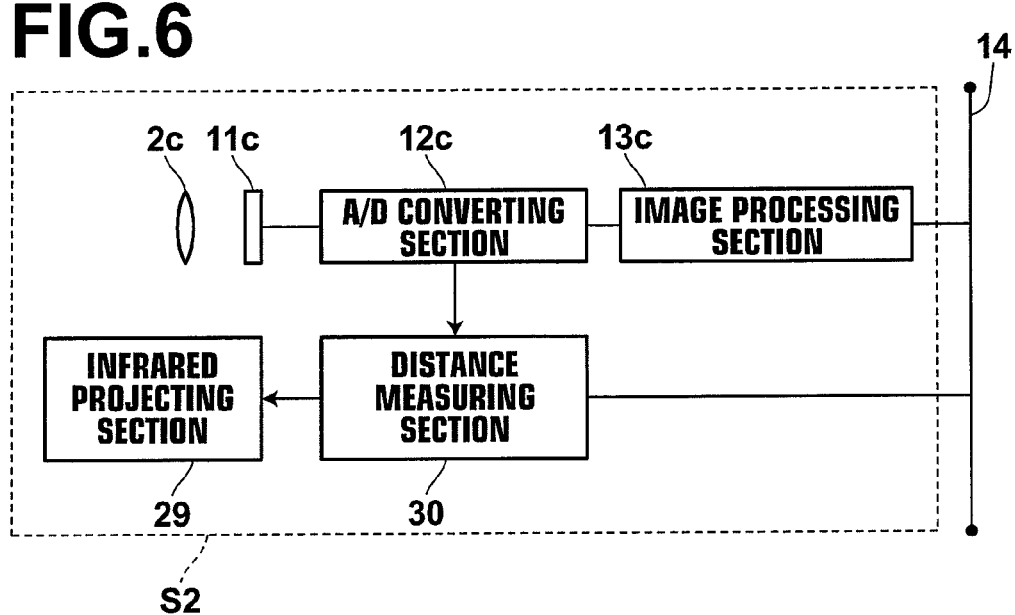
FIG. 6 is a view showing an example of another structure of the camera.

Since the stereo camera 1 is a camera which is configured to obtain the positions of points which can be viewed when viewing the photography space in one direction by a stereo method, the values of each pixel of the distance image are the values of (x, y, z) coordinates. However, in the case of a camera, in which a method other than a stereo method is employed, other values are sometimes recorded as the values of the distance image. As a camera of a type different from the stereo camera 1, for instance, that in which the structure S2 circumscribed by the broken line in FIG. 6 is substituted for the structure S1 circumscribed by the broken line in FIG. 2 is conceivable. The structure S2 comprises an imaging lens 2c, a CCD 11c, an A/D converting section 12c, an image processing section 13c, an infrared ray projecting section 29 and a distance measuring section 30. In the structure S2, the infrared ray projecting section 29 projects amplitude-modulated infrared rays. The distance measuring section 30 controls the timing of projection and the frequency of amplitude-modulation. The projected infrared rays are reflected at various parts inside the photography space and the reflected light is received by the imaging lens 2c and the CCD 11c. The A/D converting section 12c supplies signals representing the reflected light to the distance measuring section 30. The distance measuring section 30 calculates the distance and direction to all of the points which can be imaged by the camera on the basis of the instructed timing of infrared ray projection, the timing of the reflected light receipt, and the shift in phase of the projected light and the reflected light (that is, by the TOF method). That is, the values of the coordinates when a polar coordinate system is defined in the photography space are obtained. In the case of a camera provided with the structure S2, the distance image generating section 25 generates a distance image having pixel values in the form of coordinate values $(r, \theta, \phi)$ in the polar coordinate system.

Figure 7:
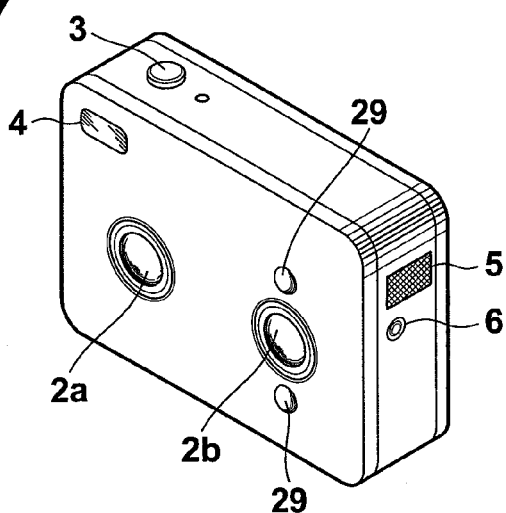
FIG. 7 is a view showing an appearance of an example of the camera having another structure.

A structure of a camera in which the camera is provided with both the structure S1 shown in FIG. 2 and the structure S2 shown in FIG. 6 and the stereo method and the TOF method are switched with each other is conceivable. FIG. 7 shows an appearance of a camera which is provided with both of the structures S1 and S2. The imaging lens 2b functions as the imaging lens 2b of FIG. 2 and at the same time as the imaging lens 2c of FIG. 6.

Although various structures for the camera for obtaining the three-dimensional information of a photography space are conceivable as described above, and the kind and the accuracy of the three-dimensional information depend upon the technique employed, any structure for the camera and any kind of the values of coordinates to be recorded as the distance image may be employed, as long as the three dimensional information related to the photography space is obtained.

Figure 8:
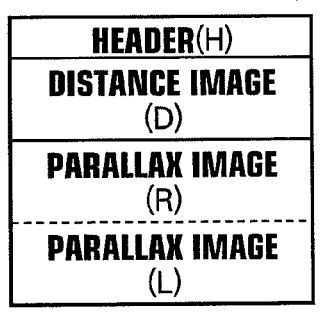
FIG. 8 is a view showing the format of the image file.

Generation of image files by the image file generating section 26 will be described hereinbelow. The image file generating section 26 generates a file whose format is as shown in FIG. 8, that is, an image file 31 including a file header H, a distance image D and a pair of pieces of YCC data (parallax images R and L). Information to be set in the file header is read out from the memories in the camera or taken in from information selected or input by the user in the setting screen displayed on the monitor 7. Parallax images R and L and a distance image D are read out from the memory 23.

Although a pair of pieces of YCC data are stored in the image file as parallax images R and L in this instance, it is possible to store only the YCC data generated from an image obtained through one of the imaging lenses. In the case of the camera having the structure described above with reference to FIG. 6, a single piece of YCC data is stored in the image file since the camera has only one imaging lens.

The image file generating section 26 temporarily stores the generated image file in the memory 23. The image file stored in the memory 23 is transferred to the read/write control section 17 under the control of the overall control section 19, and is recorded on the memory card 9 or the like by way of the card slot 8. Further, the image file stored in the memory 23 is transferred to the transfer control section 18 also under the control of the overall control section 19, and is transferred to other apparatuses by way of the external connection interface 10. Otherwise, the image file is transferred to the display control section 15 and is displayed on the monitor 7.

The format of the image file 31 is as described in detail below. The image file 31 comprises a file header H, a distance image D and parallax images R and L as described above. In the file header H, information on the offset between the top of the image file and the distance image and information on the offsets between the top of the image file and the parallax images R and L are included in addition to information on the file type and the file size. Accordingly, when the format of the header information is recognized from the information on the file type recorded on the top of the file and the information on the offsets in the header information is referred to, the distance image D and/or the parallax images R and L can be read out.

Figure 9:
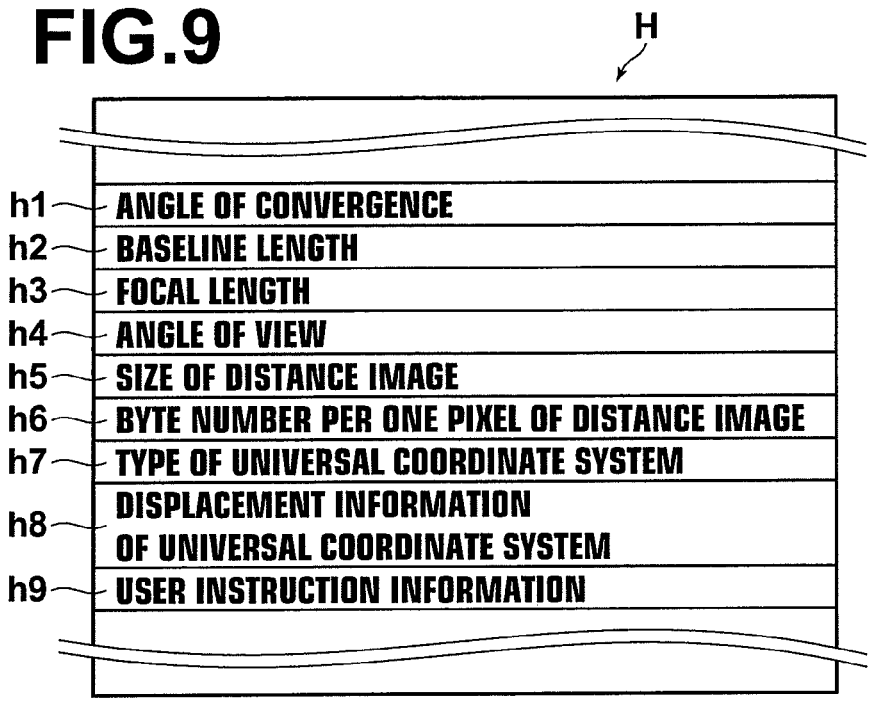
FIG. 9 is a view showing a part of the header of the image file.

Further, as shown in FIG. 9, areas for setting information on the distance image are provided in the file header H. These areas include: an area h1 where the angle of convergence when the image is taken is set, an area h2 where the baseline length is set, an area h3 where the focal length is set, an area h4 where the angle of view is set, an area h5 where the size of the distance image (the number of pixels in the longitudinal and transverse directions) is set, and an area h6 where the number of the bytes allotted to each pixel of the distance image is set. The area h3 is defined so that when a pair of imaging lenses is provided as in the stereo camera 1, the focal lengths can be set for the respective imaging lenses. In the area h4, the angle of view can be set for both the horizontal and vertical directions of each imaging lens.

The angle of convergence, the baseline length, the focal length, the angle of view, the size of the distance image, and the number of the bytes per one pixel have been determined to be inherent to the imaging system or are determined when the imaging system is adjusted. Whether these elements are inherent to the imaging system or depend upon the adjustment of the imaging system depends upon the specification of the camera. For example, in the case of a camera in which the angle of convergence is fixed, the angle of convergence is a value inherent to the imaging system, and in the case of a camera in which the angle of convergence is variable, the angle of convergence is a variable value.

The values inherent to the imaging system have been stored at a predetermined area in a predetermined memory in the stereo camera 1 (the EEPROM 22 in the overall control section 19, the memory 23, or another memory, not shown). The values determined by adjustment are stored in a predetermined memory by a control section which carried out the adjustment at the time when the adjustment is completed. The image file 26 reads out the values which are thus stored, and sets the read-out values to the respective above areas h1 to h6 of the file header.

There are further areas for setting information on the distance image provided in the file header H. These areas include: an area h7 for setting the type of the universal coordinate system (an orthogonal coordinate system or a polar coordinate system), an area h8 for setting information on the displacement of the universal coordinate system and an area h9 for setting one universal coordinate system which has been specified by the user. The information on the universal coordinate system set in the areas h7 to h9 will be described, while pointing out the problem inherent to the conventional method or apparatus which does not adopt the concept of the universal coordinate system.

Figure 10:
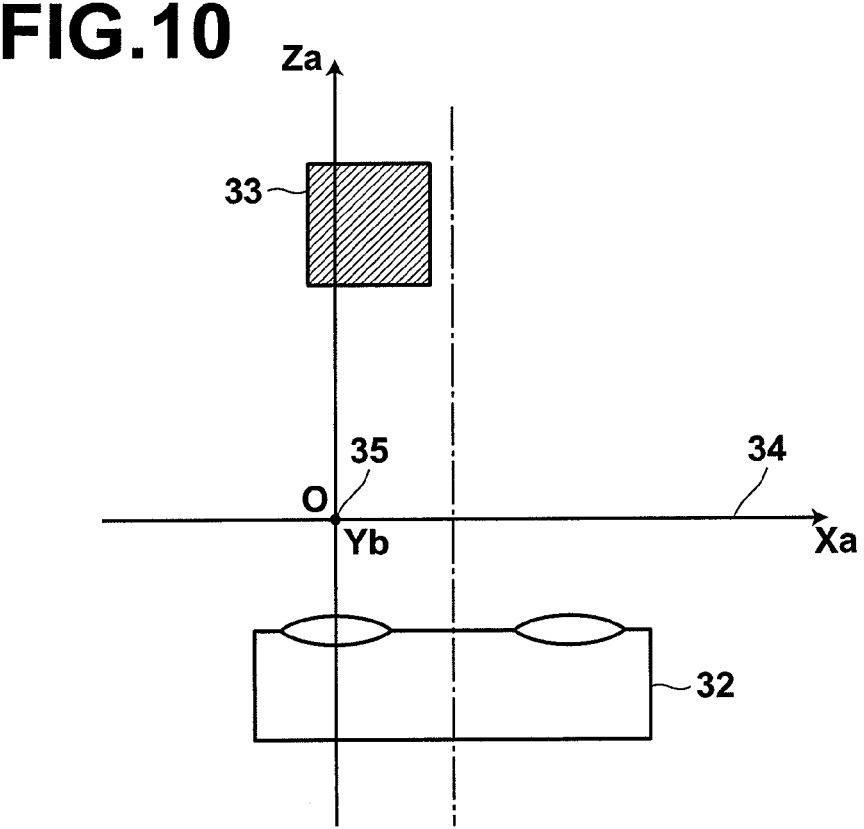
FIGS. 10 through 14 are views showing the advantages of employing the universal coordinate system.
Figure 11:
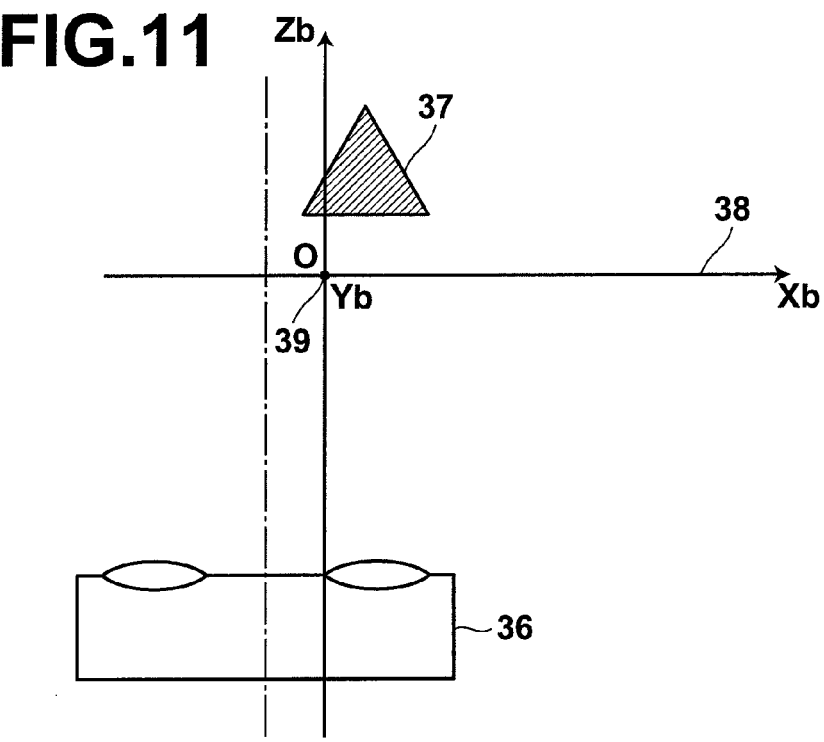

FIG. 10 shows the relationship among a first camera 32 provided with a function of obtaining three-dimensional information (such as a distance image), a photography space in which a cubic object 33 is disposed, the inherent coordinate system 34 of the first camera 32, and the origin 35 of the inherent coordinate system 34. FIG. 11 shows the relationship among a second camera 36 provided with a function of obtaining three-dimensional information, a photography space in which a triangular object 37 is disposed, the inherent coordinate system 38 of the second camera 36, and the origin 39 of the inherent coordinate system 38. In FIGS. 10 and 11, the chain lines are center lines between the left half and the right half of the camera 32 or 36. In the photography space shown in FIG. 10, the object 33 is disposed on the left side of the center line of the camera 32, while in the photography space shown in FIG. 11, the object 37 is disposed on the right side of the center line of the camera 36. As is clear from the comparison of FIGS. 10 and 11, the first and second cameras 32 and 36 largely deviate from each other in the origins of their inherent coordinate systems. In FIGS. 10 and 11, the Y-axes of the inherent coordinate systems 34 and 38 are perpendicular to the paper surface and overlap the origins 35 and 39.

Figure 12:
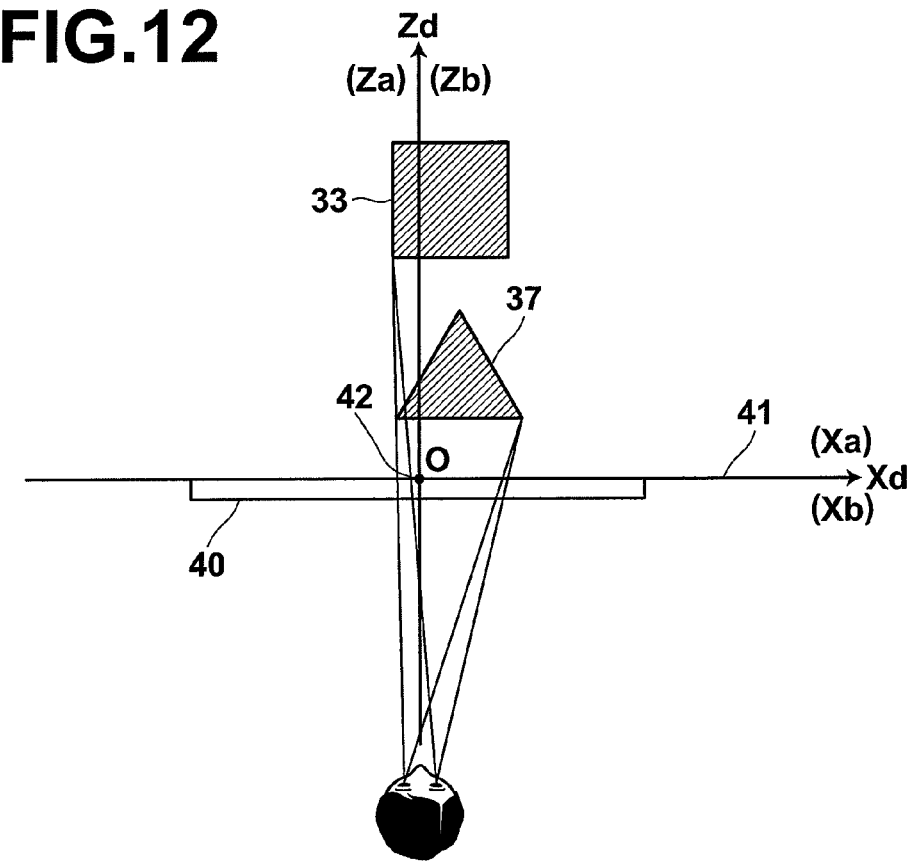

FIG. 12 is a view showing the relationship among the coordinate system 41 for display, and the objects 33 and 37 when photography is first carried out with the relative position shown in FIG. 10, photography is next carried out with the relative position shown in FIG. 11, and the two pairs of parallax images obtained through the two photography operations are synthesized for display on the stereographic monitor 40. In the conventional technique, the values of each pixel of the distance image obtained on the inherent coordinate system are used as they are as the values representing the feeling of depth of the display. That is, the relative position between the origin 35 and the object 33 in FIG. 10 is held as it is, as the relative position between the origin 42 and the object 33 in the coordinate system 41 for display. Similarly, the relative position between the origin 39 and the object 37 in FIG. 11 is also held as it is, as the relative position between the origin 42 and the object 37 in the coordinate system 41 for display. As a result, an image where the object 33 is disposed behind the object 37 is displayed on the stereographic monitor 40 as shown in FIG. 13.

Figure 14:
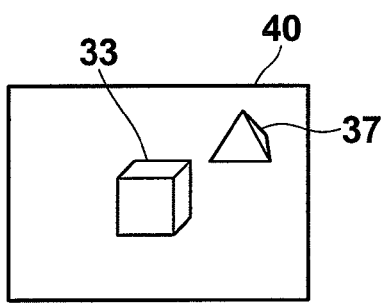

On the other hand, assume that the first camera 32 is also used when photographing the photography space including the object 37 as in the photograph of the photography space including the object 33 in the relative position shown in FIG. 11. In this case, in the synthesized stereographic image, the objects 33 and 37 are displayed apart from each other as shown in FIG. 14. This is because the object 33 is disposed on the left side of the center line of the camera, the object 37 is disposed on the right side of the center line of the camera, and the Z-axis is disposed on the left side of the center line of the camera.

Figure 13:
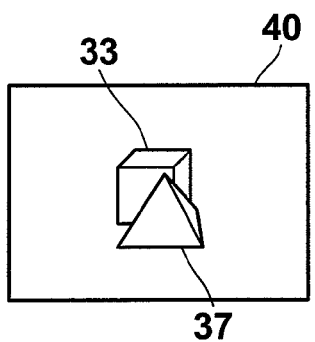

As can be understood from the comparison of FIGS. 13 and 14, in accordance with the conventional technique, when a synthetic stereographic image is to be generated from a plurality of stereographic images, the result obtained from the synthesis differs depending on the camera used during the photography thereof. For similar reasons, stabilized recognition cannot be realized so long as the same imaging system is not continuously used in accordance with the conventional technique, when the shape or the position of an object is recognized to carry out a control operation.

These problems inherent to the conventional technique can be overcome by adopting the concept of the universal coordinate system. The universal coordinate system is a coordinate system defined in the photography space as the inherent coordinate system. However, while the inherent coordinate system is defined by the individual cameras and is invisible to the user, the universal coordinate system is defined to be recognizable to the user.

Figure 15:
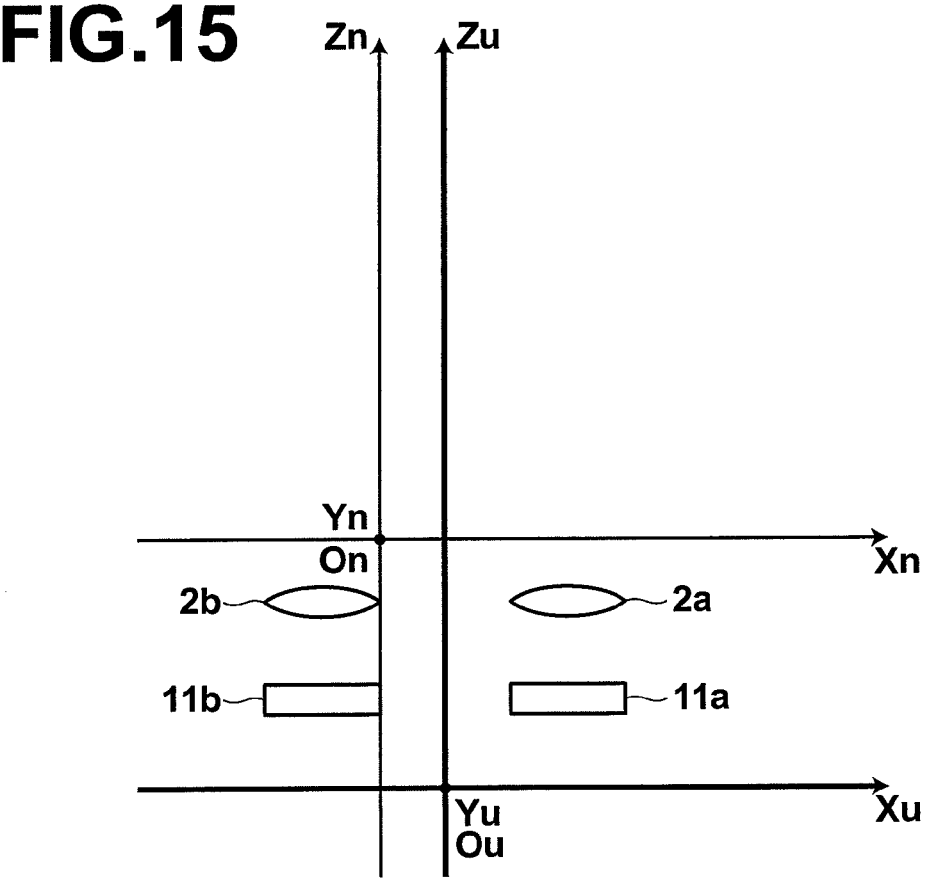
FIG. 15 is a view showing an example of the universal coordinate system.

In FIG. 15, an example of the universal coordinate system overlaps the inherent coordinate system of the stereo camera 1 shown in FIG. 5. In this example, the universal coordinate system is a three-dimensional orthogonal coordinate system with its Xu axis directed rightward from the left, its Yu axis directed upward from below and its Zu axis extending toward the photography space perpendicular to both the Xu axis and the Yu axis. Further, in this example, the origin Ou of the universal coordinate system is at the center of the rear surface of the stereo camera 1.

When generating an image file, the displacement of the origin when the coordinate system is switched from the inherent coordinate system to the universal coordinate system, or the shift between the origin On of the inherent coordinate system and the origin Ou of the universal coordinate system is recorded. In other words, the displacement vector, whose starting point is on the origin On of the inherent coordinate system and whose terminating is on the origin Ou of the universal coordinate system is recorded. For example, assuming that the position of the origin Ou of the universal coordinate system is represented by values of coordinates (vector) (xc, yc, zc) in the inherent coordinate system, the values of xc, yc and zc are stored in the file header as information on the displacement of the universal coordinate system.

When the information on the displacement of the universal coordinate system is recorded in the header of the image file, the processing can be carried out after each pixel value in the distance image is converted from the values of the coordinates in the inherent coordinate system to the values of the coordinates in the universal coordinate system when carrying out a process on the basis of the distance image such as the stereographic image process or the shape recognition process.

The problems inherent to the conventional technique described above with reference to FIGS. 10 to 14 can be overcome by converting each pixel value in the distance image obtained by the first imaging system from the values of the coordinates in the inherent coordinate system to the values of the coordinates in the universal coordinate system, converting each pixel value in the distance image obtained by the second imaging system from the values of the coordinates in the inherent coordinate system to the values of the coordinates in the universal coordinate system, and carrying out synthesis of images by the use of the distance image after the conversion. Similarly, even if the cameras are changed during the course of photography, which is continuously performed, the fact that the cameras were changed cannot adversely affect the previously performed photography by converting each pixel value in the distance images obtained by the cameras before and after changing cameras.

Further, all of the problems generated due to the fact that the coordinate system is inherent to the camera can be overcome by adopting the concept of the universal coordinate system.

Although only one universal coordinate system is defined in the above description of the universal coordinate system for the purpose of ease in understanding, a plurality of the coordinate systems which can be selected as the universal coordinate systems, that is, a plurality of the prospective universal coordinate systems, are defined in the stereo camera 1. The displacement information on all of the coordinate systems which the user can select and information for identifying the displacement information the user has selected are recorded in the file header H.

The type of the universal coordinate system set in the area h7 will be described first. The specification of the type of the universal coordinate system is received from the user in a setting screen displayed on the monitor 7 by the overall control section 19 before photography. Data input in the selection screen is once stored in the memory 24 in FIG. 2. The image file generating section 26 reads out the data from the displacement information memory 24 when generating an image file and records it in the area h7. In this instance, one of "0", "1" and "2" is recorded in the area h7, wherein "1" represents that the universal coordinate system is a three-dimensional orthogonal coordinate system, "2" represents that the universal coordinate system is a polar coordinate system, and "0" represents that the universal coordinate system is unknown, that is, the user has input no specification about the type of the coordinate system.

The displacement information of the universal coordinate system to be set in the area h8 will be described, hereinbelow. In the stereo camera 1, a total of eight points, including the center Ou1 of the rear surface of the camera body described above in conjunction with the universal coordinate system and the origin Ou0 of the inherent coordinate system, are defined as points which can be an origin of the universal coordinate system. The center Ou1 of the rear surface of the camera body described above can be recognized from the outer appearance of the camera, by displaying a reference mark 43 in the monitor 7 as shown in FIG. 16 by way of example. The reference mark 43 is only displayed when the user carries out a predetermined operation. When a camera is of a type in which the monitor is opened and closed and the state of the rear surface of the camera differs according to whether the monitor is used as shown in FIG. 17, reference marks 44a and 44b may be provided on an outer shell of the camera by printing or processing.

When a reference mark is on a member which can be recognized from the outer appearance of the camera and at a position which can be recognized from the outer appearance, for instance, when the cameras are changed, the new camera can be positioned with respect to the old camera so that the reference mark on the new camera is in the same position as that on the old camera.

FIG. 18 is a view showing other points defined to be prospective origins of the universal coordinate system. As shown in FIG. 18, the center Ou2 between the imaging lenses 2a and 2b, the centers Ou3 and Ou4 of the respective imaging lenses 2a and 2b, the center between the CCD's 11a and 11b and the centers Ou6 and Ou7 of the respective CCD's 11a and 11b are defined to be prospective origins of the universal coordinate system. Although these points are not recognizable from the outward appearance of the camera, even a point which is inside the camera body and is normally invisible can be an origin of the universal coordinate system, as long as it has a specific characteristic, such as the center or end of a predetermined member.

The coordinate values in the inherent coordinate system of these 8 points Ou0 to Ou7, that is, the displacement information, is stored in the displacement information storage section 24 upon manufacture of the camera. However, when the imaging system is provided with a zoom lens, where the focal length is variable, the displacement information stored in the displacement information storage section 24 is reset according to change of the focal length since the inherent coordinate system is re-defined according to the characteristics of the coordinate system. In this instance, the overall control section 19 functions as a displacement information setting section when a zoom operation by the user is received. The overall control section 19 detects the focal length set in response to the zoom operation and rewrites the displacement information which has been stored in the displacement information storage section 24 according to the detected focal length. Link of the focal length and the origin of the inherent coordinate system has been registered in a RAM 21 or the like in advance. By referring to the link, the origin of the inherent coordinate system corresponding to the detected focal length is obtained, and the displacement on the basis of the origin is recalculated, whereby the displacement information can be reset. The image file generating section 26 reads out the displacement information thus stored or reset from the displacement information storage section 24 and stores it in the area h8 of the file header.

FIG. 19 shows a detailed format of the area h8 in which the displacement information is set. The area h8 comprises a plurality of areas where the identifier and the displacement information are stored linked with each other. The identifier comprises a figure, an alphabetical letter, or another symbol. FIG. 19 shows a case where serial numbers starting from 0 are employed as identifiers by way of example. It is preferred that where the displacement information of each point is set be determined on the basis of a common rule determined in advance. In this instance, the displacement information of the point Ou0, that is, (0, 0, 0), is recorded linked with identifier 0, the displacement information of the point Ou1 is recorded linked with identifier 1, or as the number of identifiers are smaller, the number of the points Ou2 to Ou7 (shown in FIG. 18) linked with the identifiers becomes smaller.

The area h8 is provided with areas where cameras of a type having only one imaging lens and/or CCD sets the displacement information in addition to the areas where the stereo camera 1 sets the displacement information. They are areas where the displacement information of the center of the only one imaging lens (the area corresponding to the identifier 8) and the displacement information of the center of the only one CCD (the area corresponding to the identifier 9) a reset. Further, a spare area (the area corresponding to the identifier 10) is prepared in the area h8. Values of 0, 0, 0 are set in unused areas as shown in FIG. 19. User specified information to be set in area 9 in FIG. 9 will be described, hereinbelow. The user specified information is received in the setting screen that the overall control section 19 displays on the monitor 7 before carrying out the photographing as the type of the coordinate system. Data input in the selection screen is temporarily stored in the information storage section 24 of FIG. 2 and is read out therefrom by the image file generating section 26 to be set in the area h9. The value "0" or the value of the identifier representing one of the displacement information which the user has selected is set in the area h9. The value "0" means that the user has not selected the displacement information.

As can be understood from the description above, when the file header is structured so that a plurality of pieces of displacement information of coordinate systems can be stored and an identifier and a type of the coordinate system instructed by the user can be stored, the user can select the most convenient universal coordinate system for the processing using the image file, and can ensure the convenience absent from the conventional technique. Further, if there are problems with the universal coordinate system, one of the other coordinate systems can be re-selected. Therefore, the object can be more easily accomplished by using the universal coordinate system according to the object.

[Generation of a Synthetic Stereographic Image]

Figure 20:
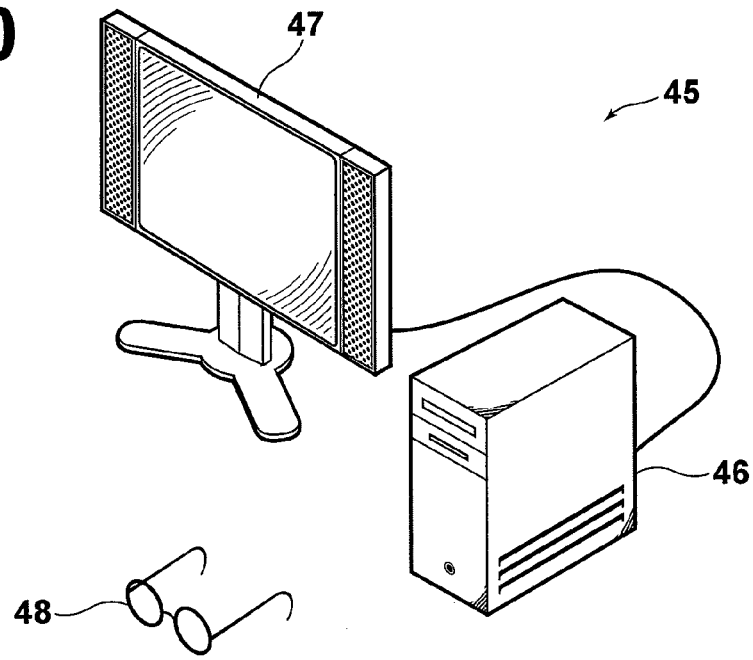
FIG. 20 is a view briefly showing a stereographic image display system.

FIG. 20 shows the schematic construction of the stereographic image display apparatus. As shown in FIG. 20, the stereographic image display apparatus 45 comprises a display control system 46, a stereographic display monitor 47, and polarizing glasses 48. When a pair of parallax images, one for the left eye and the other for the right eye, are supplied from the display control system 46, the stereographic display monitor 47 outputs a pair of images different in the direction of polarization simultaneously to one screen. The polarizing glasses 48 are glasses in which a pair of polarizing filters are disposed instead of lenses and the filtering characteristics of the polarizing filters conforms to the directions of polarization by the stereographic display monitor 47. With this structure, when viewing the stereographic display monitor 47 wearing the polarizing glasses 48, the left eye recognizes only the image for the left eye and the right eye recognizes only the image for the right eye.

Figure 21:
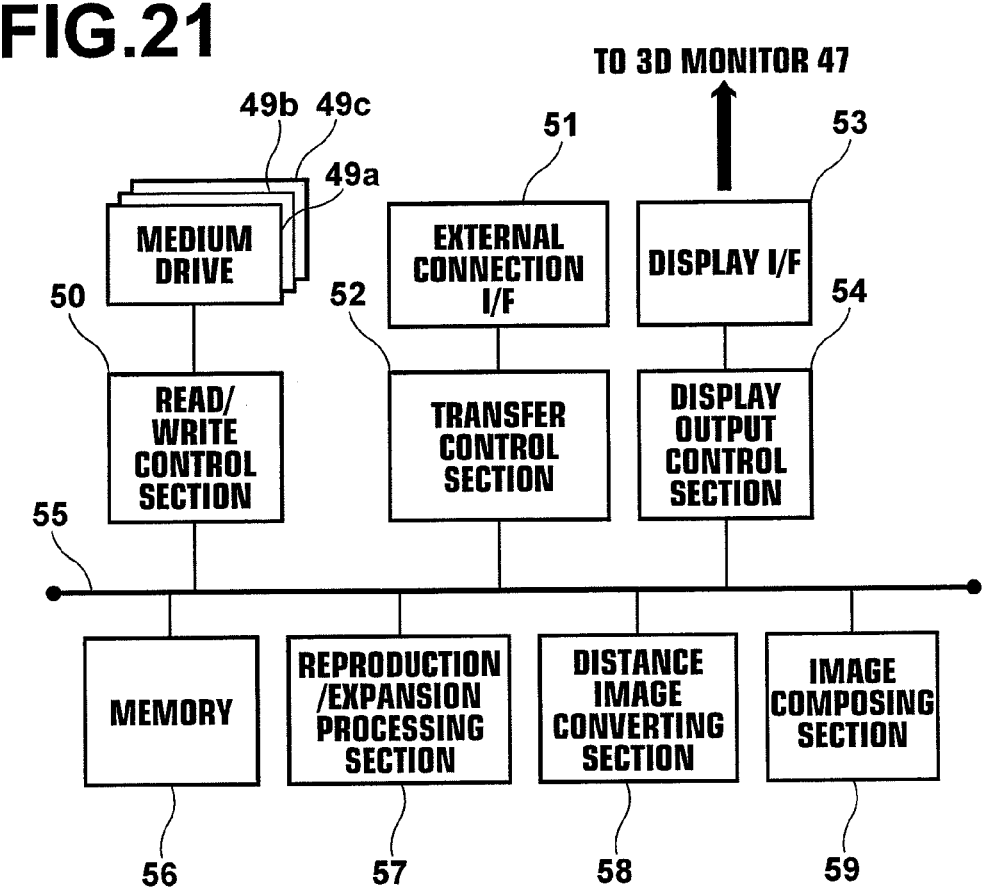
FIG. 21 is a view showing an example of the display control apparatus.

FIG. 21 shows the display control system 46. The display apparatus is provided with a plurality of medium drives 49a to 49c for driving a recording medium such as a DVD (digital versatile disk) and a memory card, a read/write control section 50 for controlling the read-out and the write-in from and to the recording medium set to the medium drives 49a to 49c, an external connection interface 51 for connecting a cable, a transfer control section 52 for controlling transfer of the image file by way of the external connection interface 51, a memory 56 which stores obtained image file or other data during the course of processing, a display interface 53 for connecting with the stereographic display monitor 47, and display output control section 54 for controlling the display output by way of the display interface 53. The read/write control section 50, transfer control section 52, display output control section 54 and the memory 56 are connected to a system bus 55.

Further, a reproduction/expansion processing section 57, a distance image converting section 58 and an image composing section 59 are connected to the system bus 55. The reproduction/expansion processing section 57 obtains, from an image file which is obtained by the read/write control section 50 or the transfer control section 52 and has been stored in a memory 56, YCC data recorded in the image file in a compressed state. Then the reproduction/expansion processing section 57 expands the YCC data to a state before compression, further carries out YCC-RGB conversion, and stores a pair of parallax images obtained by the conversion again in the memory 56.

The distance image converting section 58 executes a process P100 represented by a flowchart shown in FIG. 22. That is, the distance image converting section 58 refers to the image file in the memory and confirms whether the header of the file has the areas h1 to h9 shown in FIG. 9 (step S101). If the image file has a different structure, the following steps are not executed. If the image file has the areas h1 to h9, the distance image D and the information stored in the areas h1 to h9 of the file header H are obtained (step S102). Then, it is determined whether the user has specified the universal coordinate system, by determining whether "0" has been set in the area h9 of the file header H (step S103). If a value other than 0 has been set in the area h9 as the identifier, the displacement information linked with the identifier is obtained from the area h9 of the file header H (step S104). The coordinate values obtained as the displacement information are represented by (xc, yc, zc), here.

Then, the distance image converting section 58 converts the distance image in the inherent coordinate system to the distance image in the universal coordinate system specified by the user (step S105). Specifically, coordinate values (xc, yc, zc) indicated by the displacement information are subtracted from values (xdij, ydij, zdij) of each of the pixels forming the distance image, wherein i and j respectively show the vertical and transverse positions of the pixel. Step S105 is executed on all of the pixels forming the distance image. The distance image after the conversion is again stored in the memory 56 (step S106). When the value of the user specified information is "0" in step S103, the distance image as it is obtained in step S102 is stored in the memory 56 without conversion of the distance image (step S106).

FIG. 23 is a flowchart showing the processing executed by the image composing section 59. The image composing section 59 obtains from the memory 56 an image (RGB data) stored by the reproduction/expansion processing section 57 and the distance image after conversion which the distance image converting section 58 has stored (step S201). Then the image composing section 59 reconstructs the parallax images for the right and left eyes by the use of obtained image (RGB data) and the distance image after conversion (step S202). The reconstructed parallax images are stored in the memory 56 (step S203). The display output control section 54 outputs the parallax images stored in the memory 56 at this time to the stereographic display monitor 47.

Display control processes when a plurality of image files are taken in will be described with reference to FIG. 24, hereinbelow. When the user carries out an operation to continuously obtain the image files through the operation section (not shown), the read/write control section 50, and/or the transfer control section 52 continuously executes obtainment of the image files according to the operation of the user until the input representing completion of the obtainment is input by the user (steps S301 and S302). The image files obtained by this operation are all stored in the memory 56. The distance image converting section 58 repeatedly executes the distance image conversion process P100 described above with reference to FIG. 22 for all of the image files stored in the memory 56 (step S303).

The image composing section 59 executes a synthetic parallax image generation process P400 on the plurality of the image files stored in the memory 56 and stores a file of the generated synthetic parallax image in the memory 56 (step S304). The synthetic parallax image file stored in the memory 56 is subsequently read out from the memory 56 by the display output control section 54 and output to the stereographic display monitor 47. Further, the synthetic parallax image file stored in the memory 56 can be stored in a recording medium such as a memory card by way of the read/write control section 50, or can be transferred to other systems by way of the transfer control section 52 (step S305).

Figure 25:
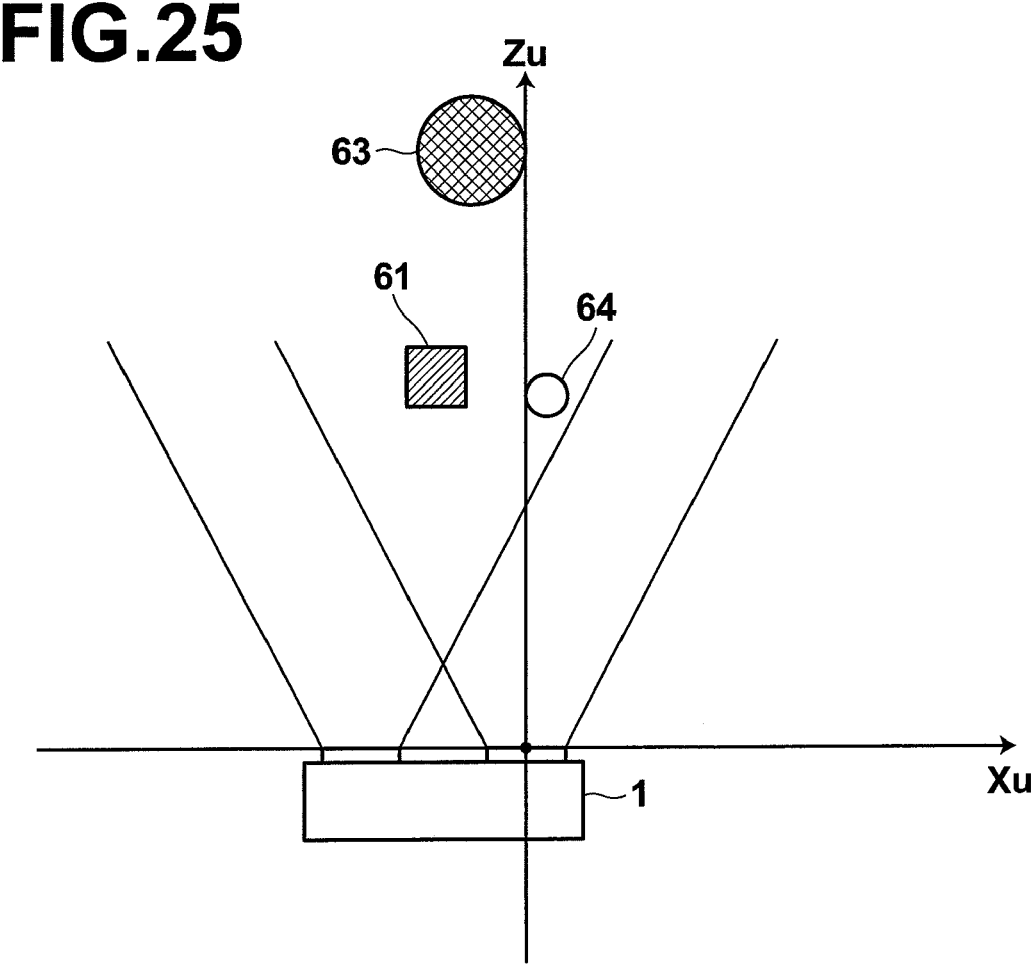
Figure 26:
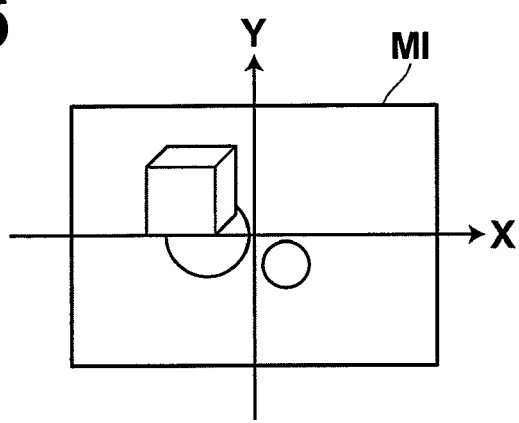
FIG. 26 is a view showing an example of the display of only the main image.

The synthetic parallax image generation process P400 will be further described hereinbelow, with reference to a case in which a pair of image files are synthesized into a synthetic parallax image as an example. FIG. 25 is a view showing the relationship among the camera, photography space and the universal coordinate system when a first image file (to be referred to as "the main image file", hereinbelow) to be synthesized is obtained. As shown in FIG. 25, the main image file is assumed to be obtained by photographing a photography space, in which objects 61, 63 and 64 are disposed, with a stereo camera 1 in a relatively wide angle of view. FIG. 26 shows an example of a display when the parallax images obtained by this photography are output to the monitor.

Figure 27:
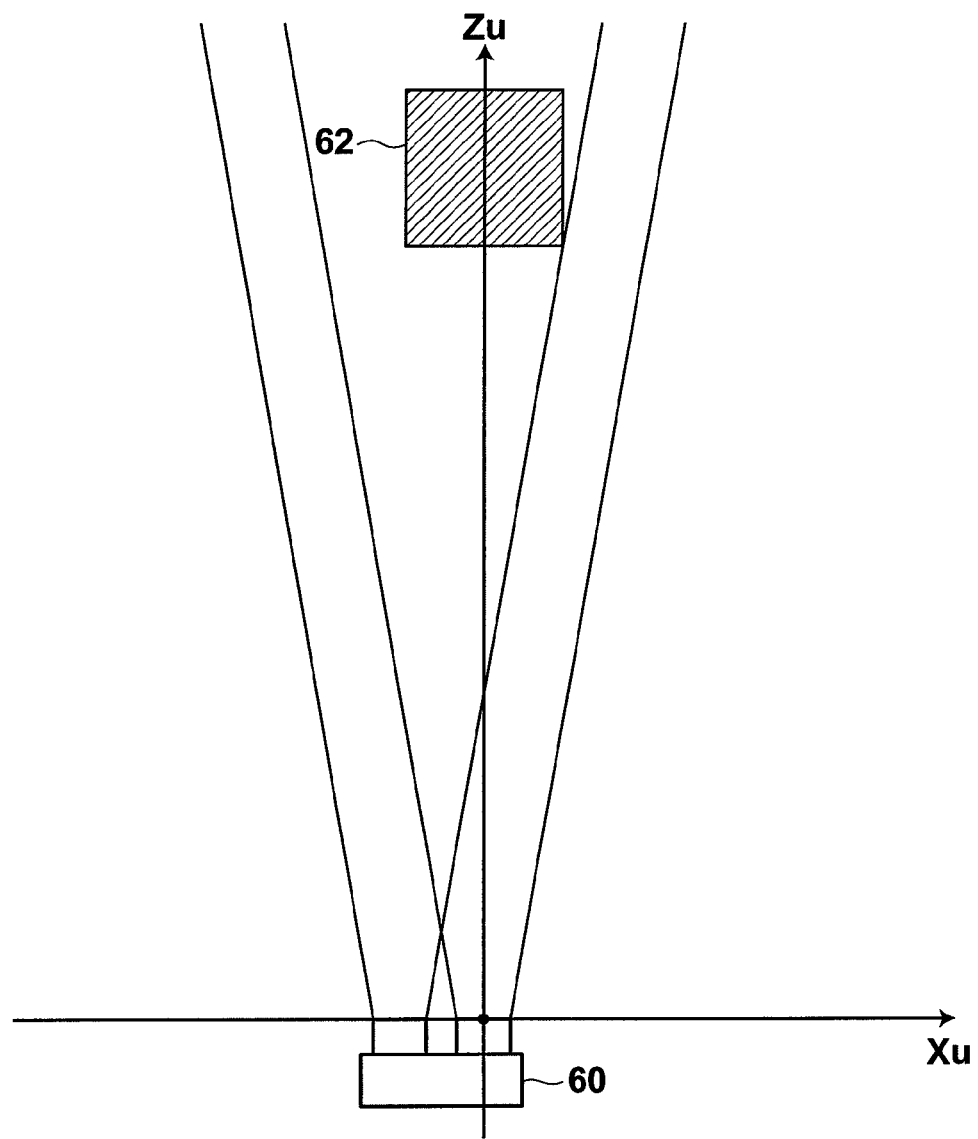
FIG. 27 is a view showing an example of the relation between the camera, photography space, and the universal coordinate system when the sub-image is obtained.
Figure 28:
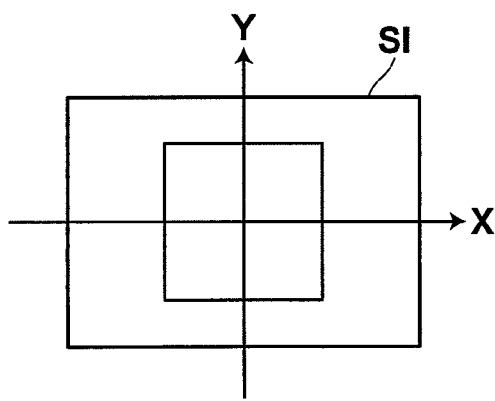
FIG. 28 is a view showing an example of the display of only the sub-image.

FIG. 27 is a view showing the relationship among the camera, photography space and the universal coordinate system when a second image file (to be referred to as "the sub-image file", hereinbelow) to be synthesized is obtained. As shown in FIG. 27, the sub-image file is assumed to be obtained by photographing a photography space, in which an object 62 is disposed, with a stereo camera 60 in an angle of view narrower than in the photographing by the stereo camera 1. The stereo camera 60 is a camera which outputs an image file of a format described above referring to FIG. 8 or 9, as the stereo camera 1. FIG. 28 shows an example of a display when the parallax images obtained by this photography are output to the monitor.

Figure 29:
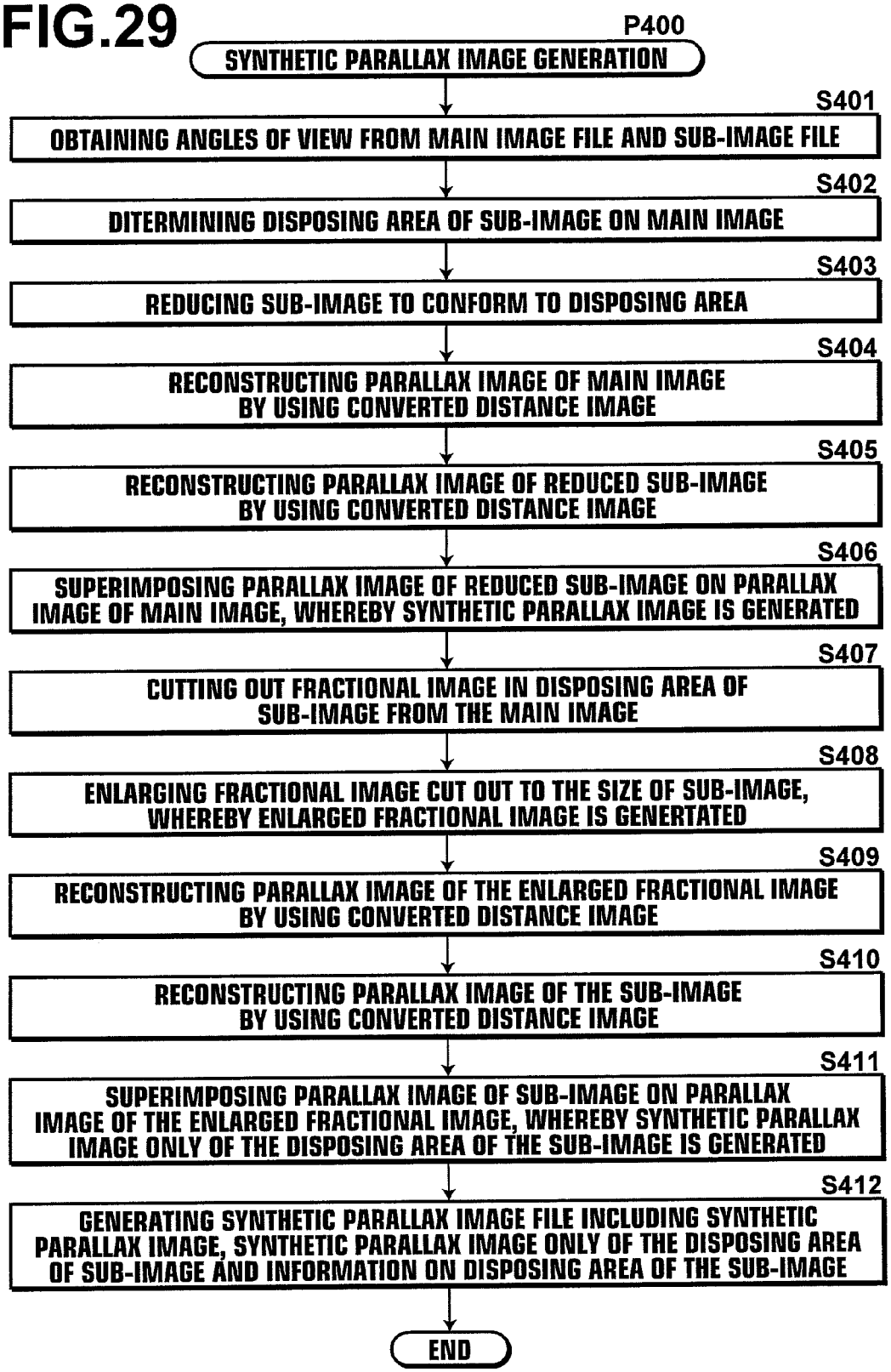
FIG. 29 is a flowchart showing an example of the processing of the synthetic parallax image.

FIG. 29 is a flow chart showing the synthetic parallax image generation process P400. The image composing section 59 first reads in the values of the angles of view $\alpha h$ and $\alpha v$ in the horizontal and vertical directions of the main image file and the values of the angles of view $\beta h$ and $\beta v$ in the horizontal and vertical directions of the sub-image file (step S401).

Figure 30:
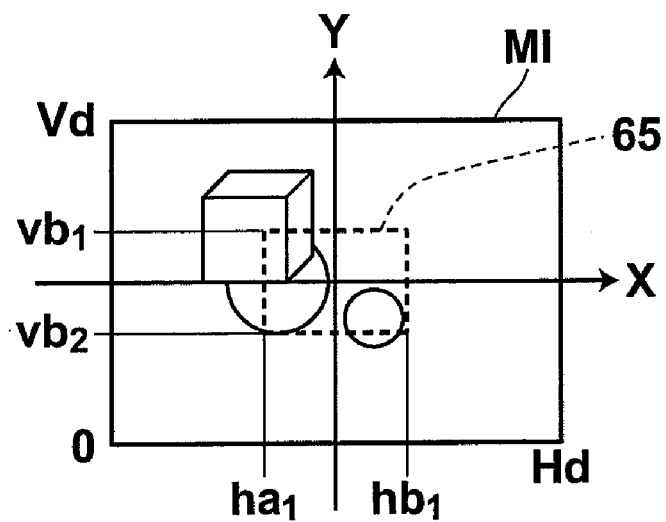
FIG. 30 is a view for describing a sub-image disposing area.

Then, the image composing section 59 calculates the disposing area on the main image M1 of the sub-image S1 when the synthesis is carried out according to the following formula (1) by the use of the values of the angle of view (step S402). In the following formula (1), Hd represents the number of pixels in the horizontal direction of the main image M1 and Vd represents the number of pixels in the vertical direction of the main image M1. Further, the disposing area of the sub-image S1 is obtained as the range ha1 to hb1 in the horizontal direction and as the range va1 to vb1 in the vertical direction when the lower left apex of the main image is taken as (0, 0) and the upper right apex of the main image is taken as (Hd, Vd). The relationship among Hd, Vd, ha1, hb1, va1 and vb1 and the disposing area 65 identified by the same are shown in FIG. 30 by way of example.

$$ha1 = (Hd/2) - (Hd/2) \times (\arctan \beta h / \arctan \alpha h)$$

$$hb1 = (Hd/2) + (Hd/2) \times (\arctan \beta h / \arctan \alpha h)$$

$$va1 = (Vd/2) - (Vd/2) \times (\arctan \beta v / \arctan \alpha v)$$

$$vb1 = (Vd/2) + (Vd/2) \times (\arctan \beta v / \arctan \alpha v) \qquad (1)$$

Figure 31:
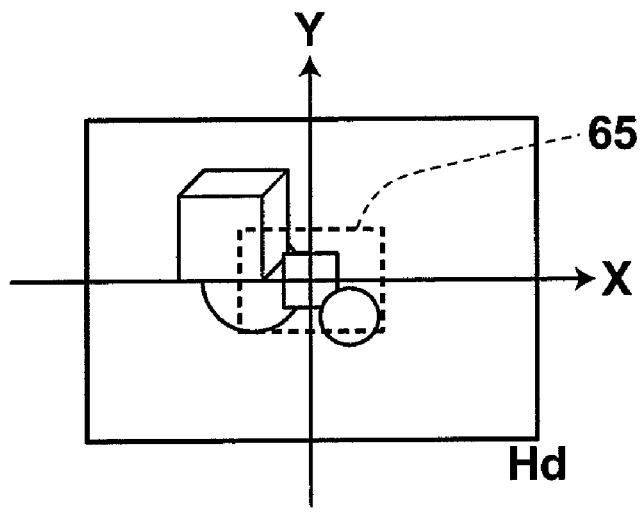
FIG. 31 is a view showing an example of the display of the synthetic parallax image.

The image composing section 59 reduces the size of the parallax image in the sub-image file to match that of the disposing area 65 obtained in step S402 (step S403). Then the image composing section 59 reconstructs the parallax image for the main image by the use of the distance image after conversion (step S404). Although the image composing section 59 reconstructs the parallax image for the sub-image by the use of the distance image after conversion also, this process is carried out on the image reduced in size in step S403, and not on the image recorded in the sub-image file (step S405). Then, the image composing section 59 generates the synthetic parallax image by superposing the reduced size sub-image parallax image composed in step S405 on the main image parallax image reconstructed in step S404 (step S406). FIG. 31 shows an example of a display when the synthetic parallax image generated in this processing is output to the monitor. When the synthetic parallax image is output to the monitor, a frame representing the disposing area 65 may be displayed together therewith. Otherwise, the frame representing the disposing area 65 may be displayed only when a predetermined manipulation is done.

The image composing section 59 in this embodiment further generates an enlarged synthetic parallax image of only the disposing area 65. Generation of the enlarged synthetic parallax image will be described, hereinbelow.

Figure 32:
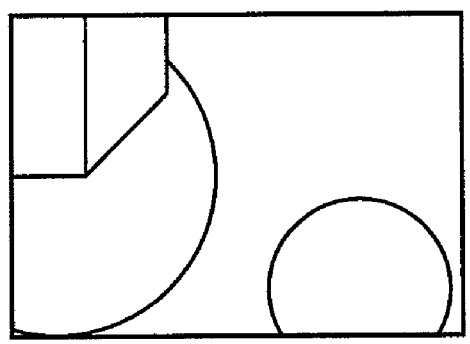
FIG. 32 is a view showing an example of the display of the partly enlarged image of the main image.

The image composing section 59 cuts out from the parallax image in the main image file, that is, from the parallax image before synthesis, a part corresponding to the disposing area of the sub-image. The part of the parallax image which has been cut out will be referred to as "the fractional image" hereinbelow. Then, the cut out fractional image is enlarged to a size equal to the size of the sub-image before reduction (step S408). The enlarged parallax image will be referred to as "the enlarged fractional image" hereinbelow. The image composing section 59 then reconstructs the parallax images of the fractional image by the use of the distance image after conversion (step S409). FIG. 32 shows an example of a display when parallax images of the reconstructed enlarged fractional image are output to the monitor.

Further, the parallax images of the sub-image are also reconstructed by the use of the distance image after conversion (step S410). Then, the image composing section 59 superposes the sub-image parallax image composed in step S410 on the enlarged fractional image parallax image reconstructed in step S409, thereby generating the synthetic parallax images of the sub-image corresponding to the disposing area only (step S411). FIG. 33 shows an example of a display when the synthetic parallax images of the sub-image corresponding to the disposing area only are output to the monitor. Then, the image composing section 59 generates a synthetic parallax image file including the synthetic parallax image generated in step S406, the synthetic parallax images of the sub-image corresponding to the disposing area only generated in step S411, and information on the disposing area obtained in step S402 (step S412).

When three or more image files are to be synthesized, it is preferred that the image having the largest angle of view of the image files be designated as the main image while the others are designated as the sub-images on the basis of the information on the angle of view read in step S401, then to perform the processes thereafter. In this case, the process related to the sub-image is executed for every sub-image. If the synthesis is carried out with the angle of view of the sub-images being larger than that of the main image, it is conceivable to carry out the synthesis after the parts beyond the angle of view of the main image is removed from the sub-images.

In the above example, that the relative position is accurately reproduced is preferred and the synthetic parallax images shown in FIGS. 31 and 33 are both reproduced faithfully to the distance image after conversion. In contrast, a form where ease of viewing is preferred to accuracy is conceivable. For example, the user would require the synthetic parallax image shown in FIG. 33 when he or she wants to better see the sub-image. Accordingly, ease of viewing may be preferred to accurate reproduction of the sub-image when displaying the synthetic parallax image shown in FIG. 33. In accordance with such a concept, a special display such as shown in FIG. 34 is preferred to the display shown in FIG. 33. That is, when there is an object in the main image that conceals an object included in the sub-image, the object in the main image that conceals the object included in the sub-image is not displayed. The ranges to be displayed and not to be displayed are set in response to user's instruction of the range in the direction of the depth of the main image. Otherwise, it is possible to automatically search the object disposed nearest to the point of view in the image, and to set the range toward the point of view than the object as the range of non-display while the other range as the range of display.

When the special display is displayed, for instance, the pixels having values corresponding to positions in the range of non-display are searched in the sub-image before the parallax images of the enlarged fraction image are reconstructed in step S409, and the values of the pixels are substituted by those representing the infinity so that the information on the range of non-display is not employed in composing the synthetic image. Thereby, since it becomes as if nothing is disposed in the range of substituted pixels, the parallax images of the partially enlarged image reconstructed in step S409 are as shown in FIG. 35. That is, the object in the main image that conceals the object included in the sub-image is not displayed. The processes thereafter are the same as the processing in steps S410 to S412 described above.

The format of the synthetic parallax image file will be described, hereinbelow. As shown in FIG. 36, the synthetic parallax image file comprises a file header H', synthetic parallax images of the overall image generated in step S406 above and synthetic parallax images of only the disposing area of the sub-image generated in step S411 above. When there are a plurality of image files, a plurality of synthetic parallax images of the disposing area only of the sub-image are recorded in the file, as shown in FIG. 36.

Figure 37:
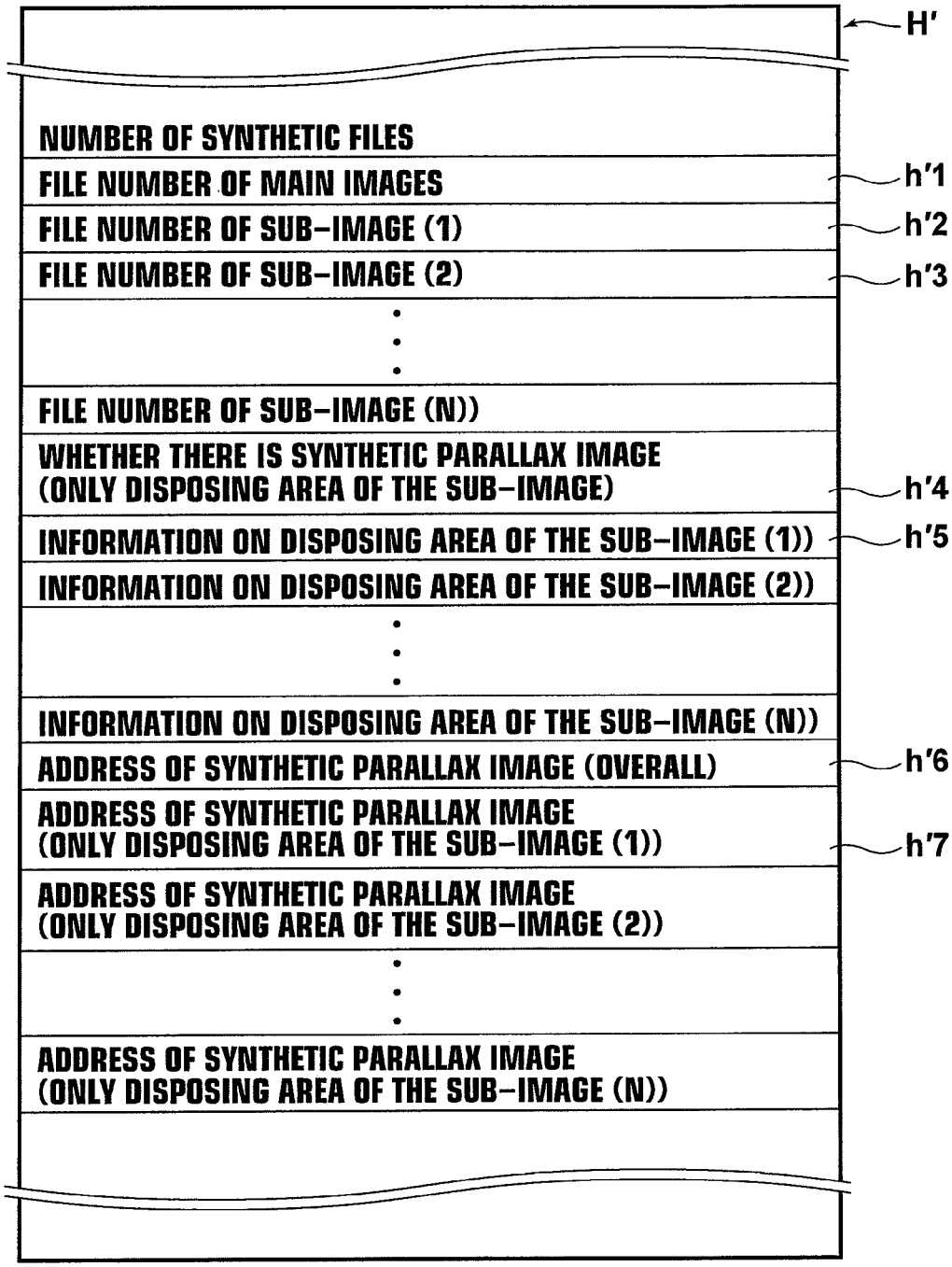
FIG. 37 is a view showing a part of the header of the synthetic parallax image file.

As shown in FIG. 37, the file header H' is provided with an area h'1 for storing the number of image files to be synthesized, an area h'2 for storing the file numbers of main image files in the memory, an area h'3 for storing the file numbers of sub-image files in the memory, an area h'4 for storing data representing whether there are synthetic parallax images of a sub-image disposing area, an area h'5 for storing the sub-image disposing area, an area h'6 for storing the address of the synthetic parallax images and areas h'7 for storing the addresses of synthetic parallax images of only the disposing area of the sub-image. The areas h'3, h'5 and h'7 are provided with areas of the same in number as those of the sub-images. In addition to the above areas, an area for storing information on the link to the original image file employed in the synthesis may be provided.

In the area h'1, the value representing the number of files is set. Each file number set in the area h'2 or h'3 is an identifier for designating the file and may be a symbol including an alphabetical letter or the like. A value of "1" is set in the area h'4 when the file includes synthetic parallax images of only the disposing area of the sub-image, and a value of "0" is set otherwise. When the processes of steps S407 to S411 are abbreviated in the flowchart shown in FIG. 29, a value of "0" is set in the area h'4. The values of ha1, hb1, va1 and vb1 obtained in step S402 are stored in the area h'5. The addresses representing the positions in which each synthetic parallax image has been stored are written in the areas h'6 and h'7. Here, the "address" here, for instance, an amount of offset from the top of the file to each synthetic parallax image shown in FIG. 36.

As can be understood from the above description, the image composing section 59 carries out the synthesis of the images by the use of the distance image after conversion by the distance image converting section 58. That is, the image composing section 59 synthesizes the parallax image on the universal coordinate system. Accordingly, when a universal coordinate system is the same in the main image file and the sub-image file is designated in the file header, the problems inherent to the conventional technique do not arise, whereby the same result can be obtained irrespective of whether the image files to be synthesized are generated by the same apparatus or different apparatuses. Especially, the conventional technique in which the offset of the positions can take place, cannot yield stabilized results in a complicated synthesis followed by enlargement/reduction as in the above example. In this embodiment since various image processes can be applied without paying attention to the offset in the positions of the coordinate systems, even a more complicated synthesis can yield stabilized results.

Further, in this embodiment, the image composing section 59 does not carry out the synthesis each time the display is carried out but the parallax images obtained by the synthesis and the information obtained in the course of synthesis are stored in an image file together with each other. Accordingly, when the display of the same synthetic parallax images subsequently becomes necessary, the synthetic parallax image in the image file has only to be reproduced on the monitor and the processing time can be largely shortened. Further, since they are stored in the form of an image file, synthesis and display can be shared between different apparatuses. By causing a different apparatus to execute the synthesis, the circuit forming the display apparatus can be simplified, which leads to reduction in size and cost of the display apparatus.

[Modifications]

Though in the above embodiment, processing of equalizing the coordinate systems of the distance images is carried out before processing of synthesis, the conversion of the distance image need not be executed when it has been known in advance that the coordinate systems are the same such as when stereographic images obtained by repeated photographs with a camera are synthesized. That is, the present invention can be applied to synthesis of stereographic images obtained with an existence stereo camera.

What is claimed is:

1. An apparatus for generating an image file for use in a stereographic display, comprising:
   one or more processors;
   a memory storing program code configured to execute on said one or more processors, said code comprising:
   a file obtaining code which obtains a main image file in which a main stereographic image is recorded and a sub-image file in which a sub-stereographic image is recorded;
   image composing code which generates a first synthetic stereographic image by reconstructing the sub-stereographic image to conform to the main stereographic image and synthesizing the reconstructed sub-stereographic image with the main stereographic image, and generates a second synthetic stereographic image by reconstructing the main stereographic image to conform to the sub-stereographic image and synthesizing the reconstructed main stereographic image with the sub-stereographic image; and
   a file generating code which generates a file of a predetermined format including the first and second synthetic stereographic images.

2. An apparatus as defined in claim 1, wherein
   the file obtaining code obtains one or more sub-image files,
   the image composing code generates a plurality of second synthetic stereographic images for each sub-stereographic image recorded in each sub-image file, and
   the file generating code generates a file of a format including the plurality of second synthetic stereographic images.

3. An apparatus as defined in claim 1, wherein
   the file generating code generates a file of a format further including information on the disposing position of the sub-stereographic image in the main stereographic image, when the sub-stereographic image is synthesized with the main stereographic image.

4. An apparatus as defined in claim 1, wherein
   the main and sub-stereographic images respectively comprising a distance image where positional coordinates in a predetermined coordinate system of points taken by an imaging system are recorded as values of a pixel corresponding to each point, and a parallax image where the color of each of the points is recorded as the value of a pixel corresponding to each point.

5. An apparatus as defined in claim 4, further comprising a distance image converting code which converts the coordinate systems of the distance image for the main stereographic image and the distance image for the sub-stereographic image, into distance images represented in a universal coordinate system common to a plurality of imaging systems.

6. An apparatus as defined in claim 1, further comprising a range setting code which sets the range in a direction of depth of the sub-stereographic image, wherein
   the image composing code reconstructs the main stereographic image to conform to the sub-stereographic image by using only information within the range set by the range setting code.

7. A method for generating an image file for use in a stereographic display, comprising the steps of:
   obtaining a main image file in which a main stereographic image is recorded and a sub-image file in which a sub-stereographic image is recorded;
   generating a first synthetic stereographic image by reconstructing the sub-stereographic image to conform to the main stereographic image and synthesizing the reconstructed sub-stereographic image with the main stereographic image;
   generating a second synthetic stereographic image by reconstructing the main stereographic image to conform to the sub-stereographic image and synthesizing the reconstructed main stereographic image with the sub-stereographic image; and
   generating a file of a predetermined format including the first and second synthetic stereographic images.

8. An apparatus for controlling display of a stereographic image, comprising:
   one or more processors;
   a memory storing program code configured to execute on said one or more processors, said code comprising:
   a file obtaining code which obtains a main image file in which a main stereographic image is recorded and a sub-image file in which a sub-stereographic image is recorded;
   a range setting code which sets the range in a direction of depth of the sub-stereographic image;
   a reconstructing code which reconstructs the sub-stereographic image to conform to the main stereographic image, and reconstructs the main stereographic image to conform to the sub-stereographic image by using only information within the range set by the range setting code;
   synthesizing code which generates a first synthetic stereographic image by synthesizing the reconstructed sub-stereographic image with the main stereographic image and generates a second synthetic stereographic image by synthesizing the reconstructed main stereographic image with the sub-stereographic image; and
   an output control code which controls the output of the first and second synthetic stereographic images to a predetermined screen.

9. A method for controlling display of a stereographic image, comprising the steps of:
   obtaining a main image file in which a main stereographic image is recorded and a sub-stereographic image file in which a sub-image is recorded;
   setting the range in a direction of depth of the sub-stereographic image;
   reconstructing the sub-stereographic image to conform to the main stereographic image and the main stereographic image to conform to the sub-stereographic image by using only information within the set range;

generating a first synthetic stereographic image by synthesizing the reconstructed sub-stereographic image with the main stereographic image and a second synthetic stereographic image by synthesizing the reconstructed main stereographic image with the sub-stereographic image; and outputting the first and second synthetic stereographic images to a predetermined screen.

* * * * *